US012791416B2

(12) United States Patent
Mikhailov et al.

(10) Patent No.: US 12,791,416 B2
(45) Date of Patent: Nov. 10, 2026

(54) INSPECTION APPARATUS AND METHOD OF OPERATING

(71) Applicant: EXPLORATION ROBOTICS TECHNOLOGIES INC., Houston, TX (US)

(72) Inventors: Oleg Mikhailov, Piedmont, CA (US); Richard Clarke, Houston, TX (US); Dmitri Kossakovski, S. Pasadena, CA (US); Jeremy Bramson, Oakland, CA (US); Steven Kennedy, Littleton, CO (US); Barbara Miglietti, New York, NY (US); James Utter, Littleton, CO (US); Yaroslav Shchekaturov, Toronto (CA); Aron Cohen, Bayonne, NJ (US)

(73) Assignee: EXPLORATION ROBOTICS TECHNOLOGIES INC., Houston, TX (US)

( * ) Notice: Subject to any disclaimer, the term of this patent is extended or adjusted under 35 U.S.C. 154(b) by 264 days.

(21) Appl. No.: 18/603,831

(22) Filed: Mar. 13, 2024

(65) Prior Publication Data

US 2025/0044176 A1 Feb. 6, 2025

Related U.S. Application Data

(60) Provisional application No. 63/529,922, filed on Jul. 31, 2023.

(51) Int. Cl.
*G01M 3/04* (2006.01)
*G01D 21/02* (2006.01)
(Continued)

(52) U.S. Cl.
CPC ............ *G01M 3/047* (2013.01); *G01D 21/02* (2013.01); *G01M 3/002* (2013.01); *G01M 3/243* (2013.01); *G01M 3/2807* (2013.01)

(58) Field of Classification Search
CPC ...... G01M 3/047; G01M 3/002; G01M 3/243; G01M 3/2807; G01D 21/02
See application file for complete search history.

(56) References Cited

U.S. PATENT DOCUMENTS 7,075,653 B1 7/2006 Rutherford
7,157,705 B2 1/2007 Hamrelius et al.
(Continued)

FOREIGN PATENT DOCUMENTS

CN 111442796 A * 7/2020 ............... G05D 3/12
CN 111707312 A * 9/2020 ............ G01D 21/02
(Continued)

OTHER PUBLICATIONS

International Search Report and Written Opinion for International Patent Application No. PCT/US23/36797, mailed Apr. 3, 2024, 9 pages.
(Continued)

*Primary Examiner* — Laura Martin Sweeney
*Assistant Examiner* — Anthony W Megna Fuentes
(74) *Attorney, Agent, or Firm* — Withrow + Terranova, PLLC; Vincent K. Gustafson

(57) ABSTRACT

An inspection apparatus includes multiple sensors (including a visual sensor and one or more additional sensor(s), such as an optical gas imager and an anemometer), a real-time clock, and an inertial measurement unit, the sensors having central observation axes aligned in parallel, with the sensors and real-time clock (and optionally a location module) configured to generate data points from multiple poses of the inspection apparatus relative to an observed object. A method for operating an inspection apparatus includes obtaining data by sweeping the inspection apparatus across a region in parallel paths and circumscribing the region, time-stamping and/or attributing location coordi-
(Continued)

nates to the data, correcting for positional offset of the sensors, collocating visual sensor data with data from other sensor(s), generating a point cloud and a 3D texture of the visual data, and generating a textured 3D model.

23 Claims, 17 Drawing Sheets

(51) Int. Cl.
*G01M 3/00* (2006.01)
*G01M 3/24* (2006.01)
*G01M 3/28* (2006.01)

(56) References Cited

U.S. PATENT DOCUMENTS

| | | | |
|---|---|---|---|
| 7,649,174 B2 | 1/2010 | Mammen et al. | |
| 7,939,804 B2 | 5/2011 | Schmidt | |
| 8,242,445 B1 | 8/2012 | Scanlon et al. | |
| 8,659,664 B2 | 2/2014 | Benson et al. | |
| 9,030,329 B2 | 5/2015 | Rutherford et al. | |
| 9,464,984 B2 | 10/2016 | Schmidt et al. | |
| 9,635,284 B2 | 4/2017 | Benson et al. | |
| 9,726,543 B2 | 8/2017 | Zeng | |
| 10,527,412 B2 | 1/2020 | Thorpe et al. | |
| 11,022,546 B2 | 6/2021 | Schmidt et al. | |
| 11,508,042 B1 * | 11/2022 | Knuffman | G06N 3/088 |
| 11,656,075 B2 | 5/2023 | Kreitinger et al. | |
| 2011/0079072 A1 | 4/2011 | Harrison et al. | |
| 2018/0188129 A1 * | 7/2018 | Choudhury | G01M 3/04 |
| 2020/0196863 A1 * | 6/2020 | Anderson | A61B 3/0008 |
| 2020/0218890 A1 * | 7/2020 | Mehta | G06V 40/172 |
| 2020/0319096 A1 * | 10/2020 | Ball | G01N 21/3151 |
| 2021/0073692 A1 | 3/2021 | Saha et al. | |
| 2022/0012988 A1 | 1/2022 | Avadhanam et al. | |
| 2022/0019213 A1 | 1/2022 | Haghighat Kashani et al. | |
| 2022/0122380 A1 | 4/2022 | Barton et al. | |
| 2023/0107797 A1 | 4/2023 | Frish et al. | |

FOREIGN PATENT DOCUMENTS

| | | | |
|---|---|---|---|
| EP | 3265996 | A1 | 1/2018 |
| EP | 3602009 | A1 | 2/2020 |
| WO | WO2018/231735 | A1 | 12/2018 |
| WO | WO2019/226908 | A1 | 11/2019 |
| WO | 2024097410 | A1 | 5/2024 |

OTHER PUBLICATIONS

International Search Report and Written Opinion for International Patent Application No. PCT/US2024/039988, mailed Nov. 25, 2024, 15 pages.

Brown et al., Informing Methane Emissions Inventories Using Facility Aerial Measurements at Midstream Natural Gas Facilities, Environ. Sci. & Technol. 2023, 57, 14539-14547.

Zimmerle et al., Detection Limits of Optical Gas Imaging for Natural Gas Leak Detection in Realistic Controlled Conditions, Environ. Sci. Technol. 2020, 54, 11506-11514.

Fluke Ti450 SF6 Gas Detector, Fluke, available online at https://www.fluke.com/en-us/profuct/thermal-cameras/ti450-sf6 (last accessed on Mar. 13, 2024).

Optical Gas Imaging, FLIR, available online at https://www.flir.com/instruments/optical-gas-imaging/ (last accessed on Mar. 13, 2024).

LaserMethane Smart, Heath Consultants, available online at https://heathus.com/product/lasermethane-smart/ (last accessed on Mar. 13, 2024).

EyeCGas 2.0, Heath Consultants, available online at https://heathus.com/product/eyecgas-multi/ (last accessed on Mar. 13, 2024).

EyeCSite 2.0, Heath Consultants, available online at https://www.opgal.com/product/eyecsite (last accessed on Mar. 13, 2024).

Remote Methane Leak Detector Complete Solution (RMLD-CS), Heath Consultants, available online at https://heathus.com/product/rmld-complete-solution-rmld-cs/ (last accessed on Mar. 13, 2024).

* cited by examiner

INSPECTION APPARATUS AND METHOD OF OPERATING

CROSS-REFERENCE TO RELATED APPLICATION

This application claims priority to U.S. Provisional Application No. 63/529,922, filed on Jul. 31, 2023, and incorporated herein by reference in its entirety for all purposes.

FIELD

The present teachings relate to an inspection apparatus and a method of operating the same.

BACKGROUND

Asset inspection is an important function of various industries due to the deterioration of assets during their life-cycle. Industry commonly employs inspection and preventative maintenance schedules to ensure proper functioning of assets and even to prolong their life-cycles by detecting problems before they can further deteriorate or possibly cause damage to the asset.

In-person inspections have traditionally been performed by visual observations, possibly with the aid of individual specialized tools to measure various features of assets. In this regard, manual methods for observation, data collection, recording, and archiving have been employed which can be a time-consuming process that is prone to various human errors and due to time constraints, limits the robustness of data that can be collected.

In some industries, such as residential and commercial infrastructure, oil and gas, and chemical processing, gas leaks are of particular concern due to the risks of human exposure, ignition, waste, and environmental damage. Naturally, gas leaks are difficult to detect as typically gasses are not detectable by human senses (e.g., by the naked eye), and more advanced methods are required to collect meaningful data.

Leaks can be generated by a variety of factors including corrosion or other modes of deterioration, inadequate or failed seals, improperly installed equipment, and the like. There is a persistent need in this field to rapidly detect and repair the points of origin for fugitive gases and there remains a need for devices and methods to increase the ease and rapidity of detection. The foregoing may also be applicable to fugitive liquids that have volatile components. These challenges are discussed in Brown et al., Informing Methane Emissions Inventories Using Facility Aerial Measurements at Midstream Natural Gas Facilities, Environ. Sci. & Technol. 2023, 57, 14539-14547.

Fluid detection has become an important issue in various industries as the world has become increasingly cognizant of environmental damage and climate change. One exemplary fluid of interest is methane generated in the natural gas supply chain. Many legal regulations and guidelines have been set forth to reduce the environmental impacts of industry by requiring regular monitoring and setting limits on contaminants that are released into the environment. In many instances, businesses have become more proactive in reducing their environmental impacts by setting internal goals that, in some cases, exceed legal standards. This trend has become even more prominent with the introduction of Environmental, Social, and Governance (ESG) scoring. Individual business performance in one or more of these categories, in addition to affecting public perception, can permit or limit opportunities for partnerships with other businesses, government contracts, overseas business relations, expansions on existing facilities and new prospective properties, or any combination thereof.

Even with the positive environmental goals of the present industrial environment in mind, it can be difficult to implement systems and processes that improve environmental impacts. Cost is one of the primary limitations in addressing these goals. While, ideally, more regular and comprehensive inspections of industrial assets using some conventional methods discussed in this section could greatly improve environmental impacts, inspection time must be matched with the salaries for doing so.

In this regard, leak detection and repair (LDAR) inspectors provide efficiency and accuracy commensurate with their experience, training, and overall skill levels. Currently, there is a limited number of LDAR inspectors in the market with the advanced skill levels that are desired to efficiently and accurately identify leak origins and accordingly order remedial actions. Even with the aid of conventional inspection systems and methods, particularly those employing advanced sensing technologies discussed below, there is a notable performance gap between less skilled and more skilled LDAR inspectors. The foregoing is discussed in Zimmerle et al., Detection Limits of Optical Gas Imaging for Natural Gas Leak Detection in Realistic Controlled Conditions, Environ. Sci. Technol. 2020, 54, 11506-11514.

In some conventional methods, sensors (e.g., IR gas sensors) only obtain qualitative gas data, such as the shape and size of gas plumes, rather than quantitative (e.g., concentration) measurements. In this regard, detecting the sources of gas leaks is met with some challenges because a gas plume can be present in a large volume of space and when viewing images rendered from qualitative gas sensors, any portion of objects within the area of the gas plume can be the point of origin. In this regard, typically when a gas plume is detected, secondary inspections (e.g., using extractive techniques described herein) must be performed in which users traverse the area to discover the point of origin. As may be appreciated, these devices and methods require multiple different types of sensing technology and detailed follow-on inspections can be time consuming. Moreover, a detected fugitive plume may be shifted from the point of origin by wind, in which case a user may search the area of the plume and still not be able to locate the point of origin therein.

In some conventional methods, sensors (e.g., tunable diode lasers) can obtain quantitative measurements but are not paired with visualization technologies. In this regard, detecting the point of origin can be possible but multiple sweeps of the sensors from different angles and/or distances to objects may be required to do so, as users are typically only provided with a quantitative readout on the sensor device. For example, sweeping the sensor from a distance to objects may distinguish regions of higher gas concentration but pipelines, tanks, and other equipment from which gas can emanate are typically complex in geometry and the point of origin can be located in various positions within a region of peak concentration. Again, wind can shift regions of peak concentrations away from the point of origin, which can elude users.

In some conventional methods, quantitative sensors have been paired with visualization technologies. However, these methods are carried out from one or a plurality of stationary positions in which equipment must be set up (e.g., fixing the sensor to a tripod) and then moved to various positions and angles for inspections. Moreover, these quantitative sensing methods require reliable background reflectors (e.g., reflective sheets set up behind the object such that the object being observed is situated between the reflector and the sensor) to obtain the quantitative gas measurements. In this regard, gas can be observed against what otherwise would be a backdrop of open sky or sub-optimal reflective surfaces. However, these methods are still time consuming and are typically performed on assets on a small scale as more comprehensive inspections (e.g., of a large region within an oil and gas facility) are time-constrained by the equipment setup process. Moreover, these methods have not been able to discern emission rates of gases because of the lack of wind speed and direction information, as well as detailed multi-dimensional spatial information of fugitive gas plumes.

There is a need for accurate emission rate information, which can be used to discern if acceptable limits have been surpassed and to triage repair efforts. Emission rate provides greater insight into the severity of emissions compared to localized concentration or visualization alone.

Some conventional visualization techniques may provide rudimentary information such as peak concentrations within an area or possibly real-time plume visualizations. However, these types of information are typically interpreted in the field, increasing the overall time of inspection. For instance, an inspector may set up an optical gas imager at a stationary location and observe the behavior of a gas plume over time (e.g., 10, 15, or even 20 minutes) to determine if a leak is present and its estimated point of origin. Moreover, there are limits in current visualization technologies when large and/or complex assets are inspected. In some cases, an asset may have dozens of conduits and/or containment vessels arranged in complex geometries, in some instances tightly packed together, some of which may be masked by intervening structures from any one vantage point of an inspector.

Furthermore, the methods described above are suitable for individual inspection events but comparisons between various different inspection events over time is difficult due to the nature of the data extracted from these methods. Often, there is a need for robust qualitative and quantitative time-lapse data comparisons and visualizations of the same in order to rapidly and effectively repair problems. For example, inspection events prior to and after a repair may be compared to determine if the problem has been adequately fixed and possibly diagnose additional problems. In this regard, there is a need for more data than conventionally available and unique visualization techniques that enable users to better diagnose problems.

Similarly, there are needs in the industry for inspections that acquire other types of data including thermal and/or acoustic measurements. In some cases, it may be advantageous to pair several types of sensing technologies to enable joint analysis of different types of data to help diagnose problems. For example, excessive heat may contribute to the volatility of some liquids and gases. In another example, turbulence within pipelines, which may be detected acoustically, can contribute to regions of higher pressure. In these regards, gas concentration measurements alone may not be enough to properly diagnose problems.

There is a need for an improved apparatus and method for performing asset inspection.

There is a need for an improved apparatus and method for detecting fluid leaks.

There is a need for an apparatus and method for detecting both quantitative and qualitative gas measurements.

There is a need for an apparatus and method for estimating emission rate.

There is a need for an apparatus and method that can allow even lesser experienced inspection personnel to achieve inspection efficiency and accuracy commensurate with more skilled inspection personnel.

There is a need for an apparatus and method for performing single-pass inspections through an environment and/or facility without the need for subsequent passes, such as subsequent passes with different sensors.

There is a need for an apparatus and method that provides freedom of movement for the user without the need to set up stationary equipment.

There is a need for an apparatus and method that can simultaneously collect thermal and/or acoustic sensing during collection of chemical data (e.g., quantitative and qualitative measurements).

There is a need for an apparatus and method that provides for the 3D modelling of inspected objects with non-visual data (e.g., chemical, thermal, acoustic, or any combination thereof) juxtaposed on visual data.

There is a need for an apparatus and method that provides for time-lapse analysis of data and/or joint analysis of different types of data (i.e., data from different types of sensors).

SUMMARY

The present teachings provide an inspection apparatus that may solve at least some of the need identified above. The inspection apparatus may comprise a plurality of sensors. The plurality of sensors may include a visual sensor and one or more of an optical gas imager, at least one anemometer, a thermographic camera, a microphone, or any combination thereof. The plurality of sensors may further comprise a location module. The location module may be adapted to attribute location coordinates to individual data points or groups of data points generated by the plurality of sensors. The inspection apparatus may comprise a real time clock. The real time clock may be adapted to time-stamp individual data points or groups of data points generated by the plurality of sensors. The inspection apparatus may comprise an inertial measurement unit.

The plurality of sensors (e.g., the visual sensor, the optical gas imager, the thermographic camera, and the microphone) may be respectively characterized by central observation axes that are aligned in parallel.

The plurality of sensors, the real time clock, and the location module may operate simultaneously to generate the data points from at least two poses of the inspection apparatus relative to an object being observed by the inspection apparatus.

The visual sensor may be an RGB camera or a stereo camera.

The inspection apparatus may be free of a LIDAR sensor.

The plurality of sensors may include the optical gas imager and the at least one anemometer.

The location module may be a GPS module.

The at least one anemometer may include a hot-wire anemometer.

The at least one anemometer may include a first anemometer and a second anemometer. The inspection apparatus may comprise a first channel and a second channel within which the first and second anemometers are respectively located. The first channel may be oriented perpendicular to the central observation axes and the second channel may be aligned in parallel with the central observation axes.

The anemometer may extend from a front of the inspection apparatus and protrudes past the other sensors.

The optical gas imager may be a tunable diode laser adapted to perform tunable diode laser absorption spectroscopy. The optical gas imager may be adapted to detect hydrocarbons (e.g., methane), hydrogen sulfide, carbon dioxide, or any combination thereof.

The inspection apparatus may be handheld.

The inspection apparatus may further comprise a visible laser that produces a beam parallel to the central observation axes of the plurality of sensors. The visible laser may be adapted to aid the user in tracing a path throughout a region of the object being observed.

The inspection apparatus may further comprise a graphical user interface. The graphical user interface may be a touch-sensitive graphical user interface. Data from one or more of the plurality of sensors may be displayed on the graphical user interface in real time or substantially real time.

The inspection apparatus may further comprise one or more wired or wireless data transmission modules. The wired data transmission modules may include an ethernet port, a USB port, an SD card reader, or the like (preferably an ethernet port). The wireless data transmission modules may include a WiFi module, a Bluetooth module, a cellular module, or the like.

The inspection apparatus may further comprises a battery (e.g., including a charging port on bottom of the handle).

The inspection apparatus may further comprises a printed circuit board.

The present teachings provide for a method that may address at least some of the needs identified above. The method may be for operating the inspection apparatus as described above. The method may comprise obtaining data from two or more of the plurality of sensors, wherein the obtaining involves a) sweeping the inspection apparatus across a region in generally parallel paths from a stationary position and b) circumscribing the region with the inspection apparatus from a stationary position.

The method may comprise time-stamping and/or attributing location coordinates to the data. The location coordinates may include a position and an orientation of the inspection apparatus.

The method may comprise correcting for positional offset of the observation axes of the two or more sensors.

The method may comprise collocating data from the visual sensor with data from the one or more of the optical gas imager, at least one anemometer, thermographic camera, and microphone.

The method may comprise performing photogrammetry on the visual data to generate a point cloud and a 3D texture of the visual data.

The method may comprise generating a 3D model with one or more textures from the plurality of sensors.

The method may further comprise discarding duplicate and/or extraneous data.

The method may further comprise validating illuminance with the visual sensor to determine if the illuminance is within a pre-determined operating range for the optical gas imager.

The method may further comprise performing a time-lapse analysis by comparison of the data from an instant inspection event to data from a prior inspection event including data of the same object.

The method may further comprise estimating an emission rate of a gas leak emanating from a point of origin and venting into the atmosphere thus forming a fugitive plume.

The estimating may include: measuring gas concentration with the open air optical path gas sensor, measuring wind speed and/or wind direction with the anemometer, and estimating the emission rate based on the gas concentration and the wind speed and/or wind direction.

The estimation may further include generating a visualization of a geometry of the fugitive plume based on a plurality of gas concentration measurements, providing the visualization as an input into a convolutional neural network, and adjusting the estimation based upon a categorical output of the convolutional neural network.

The convolutional neural network may be trained with a plurality of visualizations of fugitive plume geometry, where ground truths of each of the plurality of visualizations include discrete categories of emission models defined by dispersion from a point of origin and positional shift relative to the point of origin.

BRIEF DESCRIPTIONS OF THE DRAWINGS

DETAILED DESCRIPTION

Figure 1A:
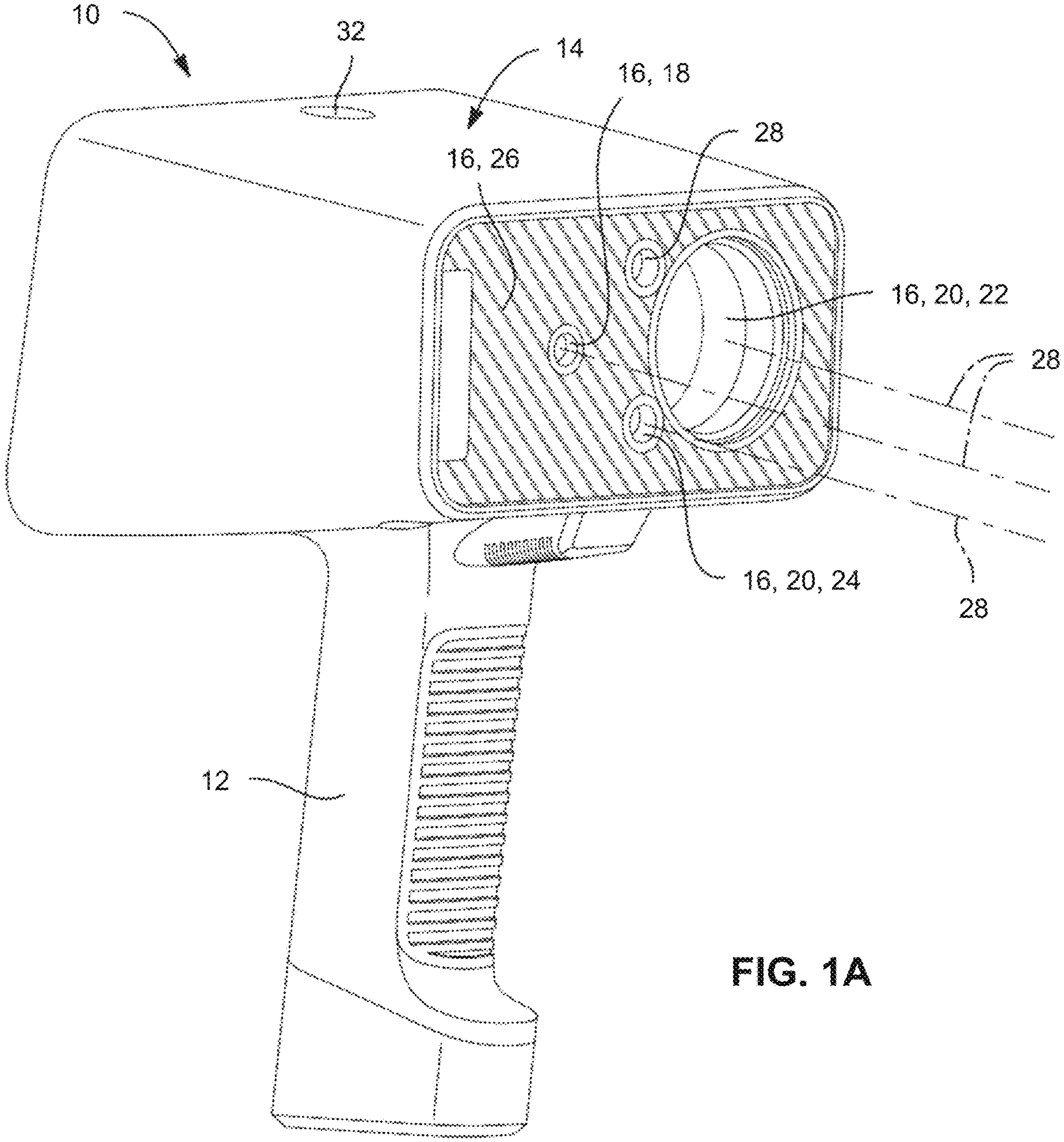
FIG. 1A is a perspective view of an inspection apparatus.

Inspection Apparatus.

The present disclosure describes an inspection apparatus. The inspection apparatus may be configured to obtain visual images, qualitative and quantitative gas measurements, thermal measurements, acoustic measurements, or any combination thereof. The inspection apparatus may be configured to obtain data that ultimately provides for visualization of two or more juxtaposed data sets on a 3D model, according to the method described herein.

The inspection apparatus may comprise a plurality of sensors. The plurality of sensors may function to sense physical phenomena and produce output signals (e.g., digital or analog) therefrom. The physical phenomena may include electromagnetic radiation, mechanical waves, mechanical movement, nuclear radiation, the like, or any combination thereof. As will be appreciated by the present disclosure, the electromagnetic radiation may be characterized by various points and/or ranges on the electromagnetic spectrum (e.g., visible, ultraviolet, infrared, radio, gamma ray, and the like) associated with wavelength and/or frequency; the mechanical waves (e.g., as sensed by accelerometers, vibration meters, microphones, the like, or any combination thereof)

may be characterized by amplitude, frequency, wavelength, or any combination thereof; and the mechanical movement may be characterized by speed, direction, or both. Nuclear radiation may be sensed by neutron detectors or any other elementary particle detectors. The output signals may include images, location coordinates, measurements of physical phenomena, the like, or any combination thereof, as discussed in greater detail below.

The plurality of sensors may be characterized by a central observation axis. Generally, the central observation axis may extend from the sensor toward an object being observed. For sensors observing electromagnetic radiation, the central observation axis may be the axis extending through the geometric center of the field of view of the sensor (i.e., the line of sight). For sensors observing mechanical waves, the central observation axis may be the axis extending through the geometric center of the acoustic pickup field (e.g., the 0 degree axis of a polar pattern). Unlike electromagnetic radiation and mechanical waves, mechanical movement (e.g., of sound, wind, or inertia) may be characterized by the directionality of physical phenomena that lies on an angular continuum of a polar coordinate system. In some aspects, one, two, or even or more discrete observation axes may be defined by tubes, channels, dishes, or the like containing one or more sensors (e.g., a directional microphone or a wind sensor), where the orientation of the tubes, channels, dishes, or the like which channel sound or receive wind, may define the observation axes.

The plurality of sensors may be located on the inspection apparatus such that the photodetectors, microphones, or the like (i.e., componentry by which electromagnetic radiation and/or sound is emitted/received) are located proximate to each other. The plurality of sensors may have a positional offset of about 5 cm or less, 4 cm or less, 3 cm or less, 2 cm or less, or even 1 cm or less. It may be appreciated by the present teachings that anemometers may not be limited in positional offset to the other sensors as wind speed and/or direction can be determined without correlation to the observation axes of the other sensors described herein. Preferably, the positional offset may be minimized to aid in the correction of positional offset described herein as well as the collocation.

The plurality of sensors may include one or more visual sensors. The visual sensor may function to convey electromagnetic radiation in the visible spectrum (e.g., about 400 nm to 700 nm) into an image. The image may be encoded in a digital medium (e.g., a non-transient storage medium), visually conveyed on a graphical user interface (e.g., an LCD or an OLED display), or both. The image may have an array of pixels arranged on an XY coordinate system.

In some aspects, photogrammetry may be performed to add a Z coordinate (depth) to the XY coordinate system. In this regard, a plurality of images may be stitched together. A point cloud may be generated from the stitched images. A texture may be generated from the point cloud. The plurality of images may be stitched based upon contextual information. The contextual information may include overlapping features within images, overlapping features within images generated from non-visual data as described herein (e.g., data from open air optical path gas sensor, thermographic cameras, microphones, and the like), data from a real time clock as described herein, data from location models described herein (e.g., location coordinates), data from gyroscopic and/or accelerometers as described herein, or any combination thereof. The visual sensors may collect 100 or more, 500 or more, 1,000 or more, 2,000 or more, or even 3,000 or more individual images of an object (otherwise referred to herein as an asset, industrial asset, or equivalent) during an inspection event. In this regard, the scanning of an object and/or region along a path described herein may provide for a plurality of images with overlapping features that can be mapped and aid in the stitching.

In some aspects, the visual sensor may be a stereo camera, which may add a Z coordinate to the XY coordinate system. The stereo camera may be employed with or without the photogrammetry described above.

In some aspects, the visual sensor may cooperate with laser imaging, detection, and ranging ("LIDAR"), which may add a Z coordinate to the XY coordinate system. LIDAR may be advantageous for providing denser point clouds. Denser point clouds may be advantageous for detail in some circumstances, but greater emphasis may be applied to data size, data processing pipelines downstream of the data collection by the plurality of sensors, and/or the overall size of the sensor apparatus, in which case the photogrammetry and stereo camera aspects may be advantageous.

The 3D coordinate system may provide for navigation (e.g., pitch, roll, yaw) of 3D models. That is, users may view different poses of the 3D models on a 2D medium (i.e., graphical user interfaces of laptop computers, desktop computers, mobile phones, and the like). In this regard, different surfaces and/or sides of the object may be viewed on a graphical user interface. The Z coordinate may be visually conveyed (e.g., on a graphical user interface) as a heat map. The data visualization may be based on any suitable color model (e.g., RGB color model).

The visual sensor may include one or more complimentary metal-oxide-semiconductor ("CMOS") image sensors, charge-coupled device ("CCD") sensors, the like, or any combination thereof. The visual sensor may generate high resolution images. As referred to herein, high resolution may mean about 10 megapixels ("MP") to 50 MP (e.g., about 12 MP or more, 15 MP or more, 20 MP or more, 30 MP or more, or even 40 MP or more). One example of a suitable visual sensor may include the Raspberry Pi High Quality Camera, commercially available from Raspberry Pi Ltd.

The plurality of sensors may include one or more location modules. The location module may function to define a location of the inspection apparatus and for correlation of the location to data obtained at that location. The location module may function with one or more satellite-based location services (e.g., the Global Positioning System ("GPS")). The location module may comprise a receiver (e.g., antenna), a microcontroller, or both. The location module may receive signals (e.g., radio signals) that triangulate the location module relative to three or more satellites (or cell towers for cellular navigation, which is within the scope of the present teachings). The location module may express location on a coordinate system such as latitude and longitude, and optionally altitude. Altitude may be advantageous in situations where a facility being inspected has different elevations, levels, or the like. The implementation of location modules in the apparatus and method described herein may be particularly advantageous for the collection of large data sets within a space. In this regard, data may be organized by the location from which the data was collected and the location coordinates attributed to data may be employed for the digital recreation of objects in 3D space.

The plurality of sensors may include one or more gyroscopic sensors. The gyroscopic sensor may function to determine rotational acceleration and deduce angular velocity, pitch, roll, and/or yaw of the inspection apparatus. The gyroscopic sensor may provide contextual information for photogrammetry. The gyroscopic sensor may cooperate with one or more anemometers in determining the directionality of wind, with one or more location modules to provide contextual information to data collected by the plurality of sensors, or both.

The plurality of sensors may include one or more accelerometers. The accelerometer may function to determine linear acceleration and deduce linear velocity and directionality. The accelerometer may cooperate with one or more anemometers in determining the directionality of wind, with one or more location modules to provide contextual information to data collected by the plurality of sensors, or both.

The accelerometer may provide contextual information for photogrammetry.

The plurality of sensors may include one or more inertial measurement units ("IMUs"). The inertial measurement unit may include one or more gyroscopic sensors, accelerometers, or both. The inertial measurement unit may function to determine a position and/or orientation ("pose") of the inspection apparatus.

It is understood that one or more contextual data sources described herein (e.g., location modules, gyroscopes, accelerometers, inertial measurement units, and real time clocks) may be used in the photogrammetry method described herein. That is, accurately correlating images, measurements, or both to an object observed by the sensors described herein may leverage said contextual data.

The plurality of sensors may include one or more open air optical path gas sensor (open path gas sensor). The open path gas sensor may function to convey electromagnetic radiation into an image, determine presence/absence of a target gas, and optionally determine concentration of the target gas. The open path gas sensor may emit a beam of electromagnetic radiation into the environment (as opposed to an enclosed measurement cell). The open path gas sensor may comprise an emitter that emits electromagnetic radiation and a receiver that receives electromagnetic radiation that is reflected. The electromagnetic radiation may travel through a target gas (e.g., a fugitive plume) and may be reflected by a solid object, such as an object from which the target gas escapes. The emitted electromagnetic radiation may be at least partially absorbed by target gas molecules in narrow bands associated with specific wavelengths and exhibit generally no absorption outside of these bands. A target gas may absorb electromagnetic radiation in characteristic wavelength bands. In this regard, the receiver may obtain attenuated electromagnetic radiation according to the Lambert-Beer relation and thereby identify the target gas and/or the concentration thereof by way of characteristic absorption patterns.

The open path gas sensor may comprise one or more mirrors, lenses, optical filters, or any combination thereof. The received electromagnetic radiation may be ultimately directed to a photodetector. The photodetectors may include infrared photodetectors or quantum well infrared photo detectors ("QWIP"). The photodetector may comprise a semiconductor material (e.g., InSb, InAs, Hg-CdTe, or the like). The semiconductors may be selected based upon sensitivity, spectral selectivity, operating temperature, peak wavelength, or any combination thereof. Regarding spectral selectivity, the wavelengths may be selected to target absorption bands of target gases and avoid absorption bands of non-target gasses.

Regarding operating temperatures, the semiconductors may or may not require cooling and associated cooling mechanisms in the inspection apparatus.

The open path gas sensor may perform infrared absorption spectroscopy. The open path gas sensor may be an optical gas imager.

The open path gas sensor may perform wavelength-modulated laser absorption spectroscopy (preferably tunable diode laser absorption spectroscopy). The open path gas sensor may employ a tunable wavelength-modulated diode laser as a light source. The wavelength of the laser may sweep between a non-absorption band and one or more particular absorption bands of a target gas. When the wavelength is tuned outside of the narrow characteristic absorption band ("off-line"), the received light is equal to or greater than when it falls within the narrow absorption band ("on-line"). Measurement of the relative amplitudes of off-line to on-line reception yields a measure of the concentration of the methane gas along the path transited by the laser beam. The collected light is converted to an electrical signal, which is processed so that fluid (e.g., methane) column density (the fluid concentration integrated over the beam length) can be reported, usually in ppm·m. Tunable diode laser absorption spectroscopy may be advantageous (over infrared radiation) with the present teachings for its ability to obtain concentration data.

One example of a suitable tunable diode laser that may be employed in the present teachings is the model S350-W2, commercially available from Henan Zhongan Electronic Detection Technology Co., Ltd.

The open path gas sensor may perform measurements at a rate of about 5 Hz to 20 Hz (e.g., 10 Hz).

The target gas may include hydrocarbons (e.g., methane), hydrogen sulfide, carbon dioxide, or any combination thereof. These are merely exemplary of possible target gases and the present teachings contemplate that the present inspection apparatus may detect and/or characterize the concentration of any gas. In general, detection may be predicated on the characteristic absorption of electromagnetic radiation by the gases. In this regard, the frequency of electromagnetic radiation emitted from the inspection apparatus may be selected to detect different types of gases.

The target gas may be chosen from a known mixture of gases. For example, methane is a component of natural gas. Thus, contextually a leak of a mixture of gases may be determined by the detection of one component of the mixture.

The optical gas imagers described herein may be advantageous over conventional extractive detection techniques that rely on drawing air through a measurement cell and performing techniques such as spectroscopic, electrochemical, solid state and piezoelectric methods, gas chromatography, flame ionization, calorimetric detection, or any combination thereof. In extractive methods, the device containing the measurement cell only draws in gas within its proximity and thus, readings must be taken within or proximate to a fugitive plume.

The open air optical path gas sensor may be sensitive to the reflectivity of object surfaces from which the electromagnetic radiation reflects, light from external sources (e.g., light bulbs or the sun) reflecting from the object, or both. The open air optical path gas sensor may operate within a range of light intensity, outside of which data collection may be suspended and/or users may be alerted. The range may be about 1 lux to 5 lux, more preferably about 2 lux to 3 lux. External light sources and or highly reflective background objects may cause the intensity to surpass the upper end of the range. Poorly reflective background objects may cause the intensity to fall below the lower end of the range. One or more visual sensors may be employed to measure light intensity. The measured light intensity may be compared against a pre-determined operating range. Outside of the pre-determined operating range, data collection may be ceased and/or a user may be alerted. In this regard, time can be saved by avoiding observations in suboptimal conditions and informing a user to move onto downstream object inspections and return, at a later time, to an object for which there were earlier suboptimal conditions.

The plurality of sensors may include one or more anemometers. The anemometer may function to convey its interaction with wind into a signal. In some aspects, the signal may be analog. The inspection apparatus may comprise an analog-to-digital converter for converting the analog signal into a digital format. The anemometer may determine wind speed, wind direction, or both. The anemometer may be any suitable type of anemometer including hot-wire anemometers, ultrasonic anemometers, acoustic resonance anemometers, or any combination thereof. Preferably, the plurality of sensors include a hot-wire anemometer (e.g., constant current anemometers, constant voltage anemometers, constant temperature anemometers, and pulse-width modulation anemometers; preferably a constant temperature anemometer).

The anemometer may be disposed within a tube or channel. The tube or channel may be oriented in a direction relative to the observation axes of the plurality of sensors. Thus, wind with a directionality that is generally co-axial with the tube or channel may enter the tube or channel and interact with the anemometer. The tube or channel may be oriented perpendicular to, parallel with, or at any angle relative to the observation axes of the sensors. The inspection apparatus may comprise 2, 3, or even 4 anemometers oriented at different angles relative to the observation axes of the plurality of sensors.

Wind direction may be determined to be coaxial to the anemometer and tube/channel assembly that interacts with the wind.

Wind direction may be extrapolated from measurements of two or more anemometers. The extrapolated wind direction may be off-axis from the axes of the anemometers. Wind speed may be employed in this regard, expressed as vectors. For example, a wind direction between 0 degree and 90 degree oriented anemometers may be determined based upon the wind speed vectors measured by the same.

Where one anemometer and tube/channel assembly is employed, preferably the directionality of the tube is perpendicular to the observation axes. In this regard, the perpendicular directionality of wind may be important for understanding and characterizing the dispersion characteristics of a fugitive plume.

For example, wind directionality perpendicular to the observation axes may result in concentration measurements that are lower relative to what they would be in the absence of wind. Real-time feedback of concentration and/or wind directionality may be communicated back to the user and prompt the user to scan a larger area to detect the leak origin and/or capture a greater portion of the fugitive plume.

In another example, wind directionality parallel to the observation axes may, in some circumstances, not provide as much information relative to the perpendicular directionality. That is, if a fugitive plume is moving towards or away from the inspection apparatus, the concentration as measured by light passing through the fugitive plume may not differentiate where along the observation axis the leak originates.

The anemometer may be employed for estimating a leak rate (i.e., volume per unit time). An algorithm and/or model may be used to determine leak rate from concentration (as determined from an open air optical path gas sensor) and wind speed correlated to the concentration measurements. Generally, the wind speed may determine the migration behavior of a fugitive plume (or lack of migration). The algorithm and/or model may factor one or more other variables including but not limited to ambient temperature, relative humidity, elevation, the like, or any combination thereof.

It has surprisingly been found that in some circumstances, directionality of wind is not required to obtain accurate leak rate estimations (e.g., 95% or more, more preferably 97% or more, or even more preferably 99% or more cooperation with an actual leak rate). Due to the handheld nature of the inspection apparatus and its method of use, measurements are typically obtained at distances from objects where leak rate estimations may be obtained without wind directionality. Moreover, by the continuous data collection and 3D modelling described herein, migrations of wind plumes may be tracked and leak rates estimated therefrom.

The plurality of sensors may include one or more thermographic cameras. The thermographic camera may function to convey electromagnetic radiation in the infrared spectrum (e.g., about 700 nm to 1 mm) into an image. The image may be encoded in a digital medium (e.g., a non-transient storage medium), visually conveyed on a graphical user interface (e.g., an LCD or an OLED display), or both. The image may have an array of pixels arranged on an XY coordinate system. In some aspects, the pixels may be mapped to the XY coordinate system of an image such as derived from a visual sensor. Thermal measurements may be visually conveyed (e.g., on a graphical user interface) as a heat map. The image may be displayed in pseudo-color.

Given the typical resolutions of conventional thermal images, which can define surfaces, edges, and other structural features, photogrammetry methods described herein may be employed in a similar manner to visual images as described above to stitch together different thermal images and render a thermal texture for a 3D model.

The plurality of sensors may include one or more microphones. The microphone may function to convey mechanical wave properties into an analog signal (e.g., by the interaction of mechanical waves with a diaphragm). The inspection apparatus may comprise an analog-to-digital converter for converting the analog signal into a digital format.

The microphone may include a directional microphone. Examples of suitable directional microphones include parabolic microphones, shotgun microphones, boundary microphones, phased array microphones, or any combination thereof.

The microphone may include any other types of microphones, such as omnidirectional microphones. In this regard, the directionality of signals may be determined by post-processing. The post-processing may include phased array processing.

Like gas data described herein and using similar methods, acoustic data can be collocated with visual data to generate a texture that can be mapped onto a 3D model.

The inspection apparatus may comprise one or more real time clocks ("RTC"). The RTC may function to measure passage of time (e.g., in terms of world time or as a timer initiated during an inspection event). The RTC may cooperate with the plurality of sensors for time-stamping output signals (e.g., images, location coordinates, measurements of physical phenomena, etc.) from the plurality of sensors. The output signals may be synchronized based on their time-stamps.

In one example, the inspection apparatus may comprise a visual sensor, an optical gas imager, an anemometer, a location module, an inertial measurement unit, and a real time clock.

In one example, the inspection apparatus may comprise a visual sensor, an optical gas imager, a thermographic camera, an anemometer, a location module, an inertial measurement unit, and a real time clock.

In one example, the inspection apparatus may comprise a visual sensor, a thermographic camera, a location module, an inertial measurement unit, and a real time clock.

In one example, the inspection apparatus may comprise a visual sensor, a microphone, a location module, an inertial measurement unit, and a real time clock.

In one example, the visual sensor may be a stereo camera, the optical gas imager may be a tunable diode laser, the anemometer may be a hot wire anemometer, or any combination thereof.

The present teachings contemplate that a combination of the following features of the inspection apparatus may provide a unique and unconventional solution that surpasses the performance of conventional devices used for asset inspection (e.g., for fluid detection, such as for methane). The properties include the handheld configuration, the optical gas imager (e.g., tunable diode laser), the visual sensor (e.g., stereo camera, preferably a high resolution stereo camera), and the anemometer (e.g., hot wire anemometer).

Conventional devices lacking one or more of these feature lack the performance of the inspection apparatus described herein. For example, some conventional devices are stationary (rather than handheld), limiting the capacity to visualize data such as the 3D modelling described herein. Some conventional devices do not include anemometers, limiting the ability to measure emission rate and/or detect a point of origin of the leak.

The present disclosure is not intended to be limited by the above examples and the inspection apparatus may comprise one or any combination of the plurality of sensors described herein, and optionally a real time clock. These examples are taken in view of typical end-user demands and cost considerations for providing various functionalities in a single apparatus.

It may be appreciated that in typical configurations of the inspection apparatus, one or more visual sensors may cooperate with one or more optical gas imagers, thermographic cameras, microphones, or any combination thereof in order to collocate data from the one or more optical gas imagers, thermographic cameras, microphones, or any combination thereof with coordinates in a 2D image and/or a 3D model. The present teachings may find particularly advantageous applications with 3D modelling of the various types of data described herein in order to provide greater detail to inspection personnel.

The inspection apparatus may comprise one or more data transmission modules/ports. The data transmission modules may function to transmit data between the inspection apparatus and one or more computing devices. The data transmission module may be wired or wireless. The inspection apparatus may comprise a combination of wired and wireless data transmission modules. Exemplary wired data transmission modules may include an ethernet port, a USB port, or the like. The wired data transmission modules may receive and perform read and/or write operations with an external memory device (e.g., an SD card, a USB flash drive, or the like). Exemplary wireless data transmission modules may include a WiFi module, a Bluetooth module, a cellular module, or the like. The inspection apparatus may receive a SIM card.

The inspection apparatus may comprise one or more graphical user interfaces. The graphical user interface may convey information to the user in real-time. The information may include gas concentration (e.g., expressed as an instantaneous reading, a maximum, a minimum, an average, or the like), gas emission rate, wind speed, name of object being observed, time, date, inspection duration, quantity of files (e.g., image frames, sensor measurements, etc.) collected, data download/upload status, a live feed from one or more of the plurality of sensors, one or more indicators (e.g., visual or audio indicators of exceeding concentration limits).

The inspection apparatus may comprise one or more printed circuit boards. The printed circuit boards (PCBs) may comprise one or more processors, memory storage mediums (e.g., non-transitory memory storage mediums), data connections, power connections, or any combination thereof. The inspection apparatus may include a PCB for computing, a PCB for peripherals (i.e., sensors, real time clocks, a PCB for data transmission modules, or any combination thereof, as well as a single PCB integrating one or more of the foregoing.

The inspection apparatus may comprise one or more processors. The processor may be in signal communication with the plurality of sensors. The processor may perform the method described herein according to computer-readable instructions. One or any combination of the sensors may comprise one or more processors that perform dedicated processes pertaining to the sensor operation (e.g., for visual sensors, converting photodetector interaction with electromagnetic radiation into digital signals), one or more processors that perform post-processing (e.g., data correlation, positional offset correction, data collocation, and the like according to the method described herein). The processor may perform some or all of the method described herein. Moreover, the present teachings contemplate a system one or more computing devices in signal communication with the inspection apparatus and which may perform some or all of the method described herein.

The inspection apparatus may comprise one or more heat sinks. The heat sinks may function to absorb heat from components of the inspection apparatus (e.g., sensors, processors, and the like).

The inspection apparatus may comprise one or more fans. The fans may function to generate airflow to carry heat away from components of the inspection apparatus and/or heat sinks.

The inspection apparatus may comprise one or more temperature and/or humidity sensors. The temperature and/or humidity sensors may function to monitor temperature and/or humidity within the inspection apparatus. The temperature and/or humidity sensors may be employed to activate/deactivate one or more fans, activate/deactivate one or more sensors, alert users, or any combination thereof. In this regard, one or more of the sensors may have an operating temperature range outside of which reliable measurements may not be obtained or possibly the sensor may be subject to damage. Particularly, tunable diode lasers may have a maximum operating temperature of about 50° C. or less, 45° C. or less, or even 40° C. or less; and/or a maximum operating humidity of about 80% RH or less.

The inspection apparatus may comprise one or more batteries. The battery (e.g., a lithium-ion battery) may provide power to the plurality of sensors and other hardware described herein, on-board the inspection apparatus, such that the inspection apparatus can be portable.

Method

The present disclosure describes a method of operating the inspection apparatus described herein.

The method may comprise obtaining data with a plurality of sensors. The plurality of sensors may comprise at least a visual sensor. The plurality of sensors may further include one or more of an optical gas imager, at least one anemometer, a thermographic camera, and a microphone.

The user may obtain data by sweeping the inspection apparatus across a region of interest with respect to an object. Within the region, the observation axes of the sensors may be swept along generally parallel paths (e.g., horizontally, vertically, or at a bias). Optionally after sweeping along the generally parallel paths, the observation axes of the sensors may be swept around the perimeter of the region. Sweeping along generally parallel paths may be performed to collect primarily the data employed for visualization and analysis. Sweeping around the perimeter may be performed to collect contextual data to aid in stitching images together.

Sweeping may be undertaken to obtain measurements within a region. Region, as referred to herein in the context of sweeping, may be understood as a pyramidic or conical region delineated by the perimetric boundaries of said sweeping. In this regard, the user is situated at the vertex of the pyramidic or conical region. The user may be stationary or in motion (e.g., walking) while sweeping.

A visible light laser may aid the user in orienting the inspection apparatus relative to an object and/or region of interest. The visible light laser may project generally parallel to the observation axes of the plurality of sensors. The visible light laser may reflect from surfaces and thus visually indicate generally where the observation axes of the plurality of sensors extend.

The sweeping may include a first sweep, a second sweep, and optionally one or more additional sweeps.

The first sweep may be across a broader region relative to the second sweep. The first sweep may be undertaken while the user is in motion (e.g., walking). The first sweep may be undertaken while a user walks around a perimeter of an object and/or region of interest, preferably around substantially the entire perimeter of the object and/or region of interest. The first sweep may be undertaken to obtain gas concentration and/or emission rate measurements that identifies if a leak is present, localize the general area of the leak origin, obtain qualitative data of the leak, obtain data for constructing a 3D model, or any combination thereof.

During the first sweep, a user may be alerted to the presence of a leak. The alert may include an audio and/or tactile (e.g., vibration) alert. The alert may be triggered by meeting or surpassing a maximum gas concentration threshold of about 150 ppm·m or less, 100 ppm·m or less, or even 50 ppm·m or less. Preferably, the max gas concentration threshold may be above a noise threshold.

The second sweep and optionally one or more additional sweeps may be across a narrower region relative to the first sweep. The second sweep may be undertaken while the user is stationary, although the user may travel to different locations around an object and remain stationary in said locations during the second sweep. The second sweep may be undertaken to obtain higher resolution data of gas concentration, emission rate, and qualitative data.

At least the visual sensor may provide for a unique and unconventional data visualization. In this regard, it is understood that the handheld nature of the inspection apparatus described herein and the manner of operating the same may provide for said data visualization by obtaining multiple images from different poses (e.g., 100 or more, 500 or more, or even 1,000 or more images). The inspection apparatus may be held about 15 meters or less, more preferably about 10 meters or less, more preferably about 5 meters or less, or even more preferably about 3 meters or less from the object being inspected. In regard to the 3D model described herein, 3 meters or less may provide for sub-inch accuracy; greater than 3 meters and 10 meters or less, may provide for 2-3 inch accuracy. Said accuracy referring to at least one dimensions of features that can be visually conveyed on the 3D model within these dimensional ranges.

The method may comprise time stamping the data with a real time clock and/or attributing location coordinates to the data via a location module. The method may comprise correlating data having corresponding time stamps and optionally location coordinates.

The method may comprise correcting for a positional offset of the observation axes of the plurality of sensors. The observation axes may be corrected to the observation axis of any one of the plurality of sensors or any other predetermined axis of reference (e.g., the geometric center of the inspection apparatus).

The method may comprise performing photogrammetry on the visual data and optionally the thermal and/or acoustic data as described herein. Coarse poses of each data point, including images/frames, may be estimated based on said photogrammetry. That is, the position and orientation of the inspection apparatus when each data point is obtained may be estimated.

The method may comprise collocating data from the visual sensor with data from one or more of an optical gas imager, at least one anemometer, a thermographic camera, and a directional microphone. By collocating, each individual data point from each of the sensors may have 3D coordinates attributed thereto for the purposes of downstream 3D modelling. The 3D coordinates may be on surfaces of an object being observed.

The method may comprise discarding duplicate and/or extraneous data. Examples of extraneous data may include background objects beyond the primary object being observed, detailed data (e.g., color, illuminance, or non-visual sensor measurements) of the ground or other surfaces around the objects, erroneous data that cannot be properly mapped to the 3D model of the object, or any combination thereof.

The method may comprise displaying the data on a graphical user interface. The data may be displayed as a 3D model with one or more textures corresponding to the different sensors. One or any combination of textures may be selectively applied to the 3D model for individual or joint analysis of the data. The 3D model may be explorable by visualizing the model in digital space from different poses. In this regard, the various angles of data obtained of objects may provide for visualization of various angles, surfaces, features, and the like of the object via the 3D model. One or more quantitative measurements may be extracted from the 3D model as discussed herein such as gas concentration and/or emission rate within a region, temperature within a region, and the like.

Images collected by the visual sensor may be processed according to methods described herein (e.g., including photogrammetry) to generate a 3D model. The 3D model may comprise a point cloud and/or one or more textures including surfaces and color. Photogrammetry may be employed to generate the point cloud from images obtained from the visual sensor, including stitching images from different poses.

The photogrammetry may include homography estimation. Homography estimation may involve determining linear and/or pivotal translations between one or more features in consecutive images and based on said translations, image stitching may be performed.

The one or more features include boundaries, corners, and the like. For example, a boundary in an image between an object (e.g., a pipe) and scenery in the background.

By said homography estimation, a plurality of images may be stitched together to generate a 3D model. Due to simultaneous or near simultaneous capturing of non-visual data (e.g., chemical, thermal, and acoustic) with the visual data, visual representations of non-visual data can be stitched in a corresponding manner.

As described herein, some gaps in images of one or more surfaces of the object may be recreated, such as by a neural network trained with training data including a plurality of images of the object. In this regard, an initial comprehensive digital modelling may allow the neural network to fill gaps in an inspection set of images.

Non-visual data may be juxtaposed onto the point cloud. The visual may be used to localize the position and orientation of any non-visual sensors (e.g., optical gas imager, thermographic camera, and microphone). It follows that the same can localize where the non-visual sensors are pointed on a surface of an object being observed. Thus, all data may be collocated (i.e., attributed 3D coordinates, such as X,Y,Z coordinates on a surface of the object). Photogrammetry may be employed for the foregoing. The photogrammetry method of generating the 3D model may be different from the collocation photogrammetry.

In view of the above, the geometry of fluid plumes may be determined. The geometry can be projected onto a surface of the 3D model. In this regard, visualizations of the fluid plumes may not appear as a plume around the 3D model of the object. Such visualization may be advantageous to efficiently determine points of origins of leaks without a plume being recreated in 3D space. Also, multiple sweeps at different distances through a plume may not be required. For example, some conventional methods may employ a series of sweeps through multiple "slices" of the plume to characterize meaningful information regarding points of origins of leaks.

By the 3D modelling described herein, peri-inspection analysis may be avoided. In this regard, data can be collected in an inspection event and analysis of the same can be performed after an inspection without the need to analyze, make judgements, and/or make adjustments peri-inspection.

The inspection apparatus may perform a method for analyzing data collected by one or more of the sensors described herein. The method may be performed on-board the inspection apparatus, remote from the inspection apparatus, or both. The method may be embodied by computer-readable instructions stored on one or more non-transient storage media. The method may be executed by one or more processors.

The method may comprise determining a position and an orientation ("pose") of one or more sensors within an environment having one or more objects arranged therein. The sensor may include a visual sensor and optionally one or more other types of sensors discussed herein. Typically, a pose of at least a visual sensor may be determined and a pose of one or more other sensors may be determined based on the pose of the visual sensor, understanding that visual data may provide comparatively greater detail that aids in the accuracy of the outputs of the neural networks discussed herein.

The method may comprise obtaining inspection data. During an inspection event, one or more of the sensors described herein may observe objects and/or an environment in which the objects are situated. Each portion of the inspection data may be obtained from a pose relative to an object being observed. The data may include, for each pixel, RGB data (although other color models may be contemplated by the present teachings), depth data, single-spectral electromagnetic data, multi-spectral electromagnetic data, thermal data, acoustic data, chemical data, or any combination thereof. The electromagnetic data may include radiation, reflection, absorption, or any combination thereof. The acoustic data may include amplitude. The chemical data may include concentration.

At least visual data acquired by visual sensors may be employed to generate one or more images and/or one or more point clouds for 3D models. In this regard, any other types of data (e.g., thermal data, single-spectral electromagnetic data, multi-spectral electromagnetic data, chemical data, acoustic data, or any combination thereof) may be mapped onto an image or a point cloud. In other words, any type of data discussed herein may be associated with coordinates in Euclidean space. By such coordination, users may visualize different types of data on 2D images and/or 3D models. Moreover, as will be discussed herein, the present method seeks to provide textures of data acquired from different types of sensors (e.g., thermal sensors) that cooperate on a pixel-by-pixel basis with visual data.

The method may comprise estimating one or more poses of corresponding one or more input images from the inspection set of visual data and optionally the inspection set of thermal data. The poses may be estimated by the CNN. The CNN may include one or more layers that function to estimate the poses of semantically segmented images. The output of the CNN (the estimated pose) may be referred to herein as a coarse pose. A coarse pose is so-termed relative to a fine pose, which is discussed hereunder.

Regarding thermal data, or other types of data discussed herein, semantic segmentation may assist in organizing inspection data. In one aspect, a human operator may view a thermal image mapped onto a visual image to determine the temperature of an object and/or subcomponents thereof. In another aspect, all temperature measurements of a single object can be averaged (e.g., mean, median, mode) or otherwise analyzed (e.g., maximum, minimum, etc.) and such quantity can be attributed to the object and/or sub-component, as the object and/or sub-component is identified by the features thereof.

The method may comprise generating one or more synthetic images for corresponding one or more coarse poses. The synthetic images may be generated by an interpolation neural network. The interpolation neural network may receive a coarse pose from the CNN and output a synthetic image corresponding to the coarse pose. The synthetic image is predicted by the interpolation neural network based upon the training set of data and the coarse pose estimated by the CNN.

Where the interpolation neural network predicts synthetic images for non-visual types of data discussed herein, the coarse pose of an image is assumed to be equal to the coarse pose of the corresponding visual image. This assumption may be based on a sensor being located on-board the same robot as the visual sensor. In this regard, the sensors may be located close to each other (e.g., distanced by about 60 cm or less, 50 cm or less, 40 cm or less, 30 cm or less, 20 cm or less, or even 10 cm or less). This assumption may be adjusted in the refining step discussed below.

The coarse pose estimated by the CNN may ease processing operations in the refining step. That is, since the refining step seeks to adjust the coarse pose such that the synthetic image cooperates with the input image, the more adjustment required in refining, the more processing time may be required. The present method seeks to employ a CNN that estimates a coarse pose that is close to the actual pose of the sensor. The coarse pose may deviate by 5% or less, 2% or less, 1% or less, or even 0.1% or less from the actual pose of the sensor.

The method may comprise refining the one or more coarse poses. The coarse poses may be refined to obtain a fine pose. The coarse poses may be refined by minimizing the difference between the synthetic image and the input image. This may apply to visual images and optionally images generated from any other type of sensor discussed herein (e.g., thermal, acoustic, chemical, etc.). In this regard, the synthetic image may be shifted such that individual pixels of the synthetic image correspond to individual pixels of the input image. Such shift of the synthetic image can be characterized by a corresponding shift applied to the coarse pose. By way of example, shifting the pose of a visual sensor by 10 cm in the X direction results in a corresponding shift in the pixels of an image.

Refinement of visual images and thermal images may be performed in-series or simultaneously.

The visual image may be refined and then the thermal image may be refined.

A form of the interpolation neural network may be employed for refining the coarse poses. For example, iNeRF (Inverting Neural Radiance Field) may be employed. iNeRF may comprise an additional head for refining the coarse pose of non-visual images. Thus, refining the coarse poses of a visual image and a corresponding non-visual image may be performed simultaneously.

Head, as referred to herein, may mean modules of a neural network specialized for determining a desired output. Each head may receive an input from the backbone of the neural network and generate a desired output. The input from the backbone may be common to all the heads. The outputs of each head may be unique relative to the other heads. For example, a first head may be configured for predicting synthetic visual images (e.g., replicating an image including data that would otherwise be obtained from a camera) and a second head may be configured for predicting synthetic non-visual images (e.g., replicating an image including data that would otherwise be obtained from non-visual sensors described herein such as a chemical sensor, a thermal sensor, an acoustic sensor, or any combination thereof. Discrete types of non-visual data may be processed by unique heads.

The fine pose may be about 99% or more, 99.5% or more, or even 99.9% or more accurate to the actual pose of the sensor that obtained the input image. The present teachings contemplate that it is possible, in some circumstances, that the coarse pose may be as accurate to the actual pose as the intended accuracy of a fine pose. In this regard, refining may not be performed for a given image. However, typically the coarse pose may be less accurate to the actual pose relative to the fine pose.

The neural networks described above may be trained with genuine 2D images, one or more 3D models derived from the genuine 2D images, one or more 3D models constructed by a human via CAD software, one or more 3D models constructed from photogrammetry software, one or more 3D models constructed from point cloud software, or any combination thereof.

The method of the present teachings may not require location tracking technology on-board a sensor. Inspection data may include images with no known pose. However, by the present method, pose may be determined.

The fine pose determined by the present method may be employed for downstream processes including generating 3D models, stitching 2D images together, performing time-lapse analysis, performing joint analysis, or any combination thereof. Time-lapse analysis may refer to comparing outputs of the above method generated from an inspection set of data to historical data. Joint analysis may refer to referencing data ultimately derived from different types of sensors to identify anomalies in the objects and/or environment being inspected.

One example of a suitable method described above may include that described in U.S. Provisional Application No. 63/422,043, incorporated herein by reference for all purposes.

In another aspect, an inertial measurement unit ("IMU") may determine the coarse pose of the inspection apparatus when each measurement, including images/frames, are obtained. The IMU, optionally in cooperation with GPS and/or a real time clock, may be used to estimate coarse pose in lieu of photogrammetry. In this regard, processing time and power associated with photogrammetry may be eliminated.

Use of the inertial measurement unit may provide some benefits over photogrammetry. That is, complex transformations, such as a combination of linear and pivotal translations, or translations of a relatively large magnitude (e.g., a user rapidly moving the inspection apparatus along a large angle) can increase the processing times and reduce the fidelity of photogrammetry. However, the inertial measurement unit may determine the pose of the inspection apparatus as a data point is obtained, thus obviating the need for photogrammetry processing.

The method may comprise estimating an emission rate. Emission rate may be estimated based on one or any combination of emission models described herein. Flow rate may be generally estimated based upon measurements obtained from the open air optical path gas sensor and the anemometer. It has surprisingly been found that fugitive plume geometry can increase the accuracy of the emission rate estimation. In this regard, emission models accounting for fugitive plume geometry are proposed by the present teachings to estimate emission rate.

Without intending to be bound by theory, the open air optical path gas sensor may determine an integral of gas concentration along the entire path of the laser and thus the measured gas concentration of fugitive plumes dispersed across a large area may, in some circumstances, be generally equal to measured gas concentration of fugitive plumes concentrated within a small area. Accordingly, their respective estimated emission rates may be generally equal. Although, independent of the effects of wind, it may be appreciated that fugitive plumes dispersed across a large area typically indicates a greater emission rate due to the exit velocity from their points of origin propelling gas further. Fugitive plume geometry may provide a more complete assessment of emission rate.

The emission models may include a buoyancy model. The buoyancy model may be characterized by fugitive plume geometry that is concentrated close to the point of origin and/or is shifted from the point of origin commensurate with the wind direction and wind velocity. The buoyancy model indicates low emission rates owing to a low exit velocity that does not propel the fugitive plume far from the point of origin and/or not in a direction different from the direction of wind.

The emission models may include a dispersion model. The dispersion model may be characterized by fugitive plume geometry that has greater dispersion relative to the buoyancy model and/or is shifted from the point of origin relatively greater than the buoyancy model. The dispersion model indicates moderate emission rates owing to a moderate exit velocity that propels the fugitive plume from the point of origin and/or in a direction different from the direction of wind.

The emission models may include a jet model. The jet model may be characterized by fugitive plume geometry that has a greater dispersion relative to the dispersion model and/or is shifted from the point of origin relatively greater than the buoyancy model. The jet model indicates large emission rates owing to a large exit velocity that propels the fugitive plume from the point of origin and/or in a direction different from the direction of wind.

The present teachings contemplate that a combination of emission models may be used to estimate emission rate. That is, a fugitive plume may have characteristics of two or more of the emission models. Each of the emission models may be weighted based upon their cooperation with fugitive plume geometry, estimated emission rate, wind direction, wind speed, or any combination thereof. For example, for a given fugitive plume a 40% weight may be applied to the buoyancy model and a 60% weight may be applied to the dispersion model.

Emission rate may be estimated, at least in part, by a neural network (e.g., a convolutional neural network). A visualization of fugitive plume geometry may be provided as an input into the neural network. A categorization of one or more emissions models described herein may be provided as an output from the neural network.

The neural network may be trained with data sets including visualizations of fugitive plumes. The leaks generating these fugitive plumes may be controlled, thus, the emission rate may be known. Thus, ground truths may be established. The foregoing may be referred to as staged training data. The neural network may continue to be trained with non-staged data. That is, data of genuine leaks where the emission rate is unknown.

Emission rate may be determined based upon one or more gas concentration measurements from an open air optical path gas sensor and one or more measurements of wind speed and/or wind direction from an anemometer. It has surprisingly been found that the visualization of the geometry of a fugitive plume may increase the accuracy of emission rate. In this regard, the emission rate estimated from gas concentration measurements and wind speed and/or wind direction may be corrected by factoring in the output of the neural network described above. That is, a categorization of the geometry under one or more emissions models.

The method may comprise creating a digital emissions tag ("DET"). The DET may function to determine the presence of leaks, confirm the absence of leaks, localize the leaks so that a technician may later find the leak and administer repairs, provide evidence of regulatory compliance, or any combination thereof.

Conventionally, technicians go afield with gas sensors, such as optical gas imagers, and when leaks are identified they mark the source by various means such as tying a ribbon around the source; driving a stake into the ground by the source; or even making markings (e.g., in paint, chalk, etc.) on the source. Thus, the source may be later found by technicians tasked to repair the leak.

The digital emissions tag may include at least a visualization of a gas leak (visualization overlaid on image or video; where video, optionally in real-time), a maximum concentration, and an emission rate. The digital emissions tag may further include one or more of GPS coordinates, inspection apparatus pose, time/date, temperature, and source ID. "Source ID," as used herein, may refer to the identification of a leak source such as a pipe, a well head, a compressor, or the like.

Source ID may be determined by various methods. In some aspects, a neural network (e.g., a convolutional neural network) may be trained with source images and thus output a source ID based on an image input. In some aspects, GPS coordinates, pose, and/or time may be used, in reference to a pre-defined map where source IDs are localized. In some aspects, a user may manually input the source ID, such as when the DET is generated or at a later time. The present teachings contemplate that one or any combination of the foregoing methods may be used.

Typically, most (e.g., about 90% or more, or even about 95% or more) leaks occur at flanges, where two pipes meet. Although, the present teachings contemplate other sources of leaking such as corrosion or mechanical damage along the length of a pipe. In this regard, the training data fed to the neural network described above may be biased toward flange detection.

The DET may be created upon a user manually instructing the inspection apparatus to "start" and "stop" recording. During recording, a user may sweep the inspection apparatus across a region having a max gas concentration above a threshold. A user may be alerted when this threshold is met or surpassed, as described herein. The user may be stationary while sweeping the inspection apparatus. The DET may be created during a second sweep, as described herein. The sweep may provide for a visualization of a fugitive plume.

There may be multiple DETs created for the same source ID, where multiple leaks are on the same equipment.

The method may comprise generating a digital compliance record. The digital compliance record may function to certify the absence of leaks or leaks below a threshold emission rate (e.g., according to internal policies or government regulations).

The digital compliance record may include one or more of GPS coordinates, inspection apparatus pose, time/date, temperature, and source ID. The digital compliance record may further include a maximum concentration and an emission rate, even if the value is 0.

The digital emissions tag and/or the digital compliance record may be generated on-board the inspection apparatus or remote from the inspection apparatus. The digital emissions tag and/or the digital compliance record may be stored in a database. The digital emissions tag and/or the digital compliance record may be communicated to stakeholders such as the facility's management, regulatory bodies, or other third parties.

Example 1

The sensor apparatus was tested in the field to inspect methane leaks emanating from equipment. The sensor apparatus comprised a tunable diode laser, high resolution camera, and anemometer. The sensor apparatus was handheld and carried through the inspection site by an operator. The operator may be considered a "low experience leak detection and repair inspector," as described herein. Proximate to equipment being inspected, that is about 10 meters or less, the operator walked around the equipment and while walking, swept the sensor apparatus across equipment.

Controlled releases were induced in a selection of equipment with the emission rate of each controlled release being known in single-blind fashion. Operators were unaware which equipment the induced leaks emanated from and the emission rate of each induced leak. Moreover, a number of false positives were introduced into the field.

A confidence level of 90% was achieved for a emission rate detection level of 4.0 liters/minute. That is, at levels below this figure, the confidence level decreases. For comparison, high experience leak detection and repair (LDAR) inspectors (i.e., those with 700 to 4,000 individual survey events of experience) employing optical gas imaging (OGI) devices have a 90% confidence level for emission rate detection levels between 2.6 liters/minute and 7.7 liters/minute. Low experience leak detection and repair inspectors (i.e., those with 25 to 250 individual survey events of experience) employing OGI devices have a 90% confidence level for emission rate detection levels over 20 liters/minute.

Thus, the trial proved that low experience LDAR inspectors employing the sensor apparatus of the present application can achieve a 90% confidence level within the emission rate detection levels of high experience LDAR inspectors.

The sensor apparatus showed a 92% true positive detection rate and a 2% false positive detection rate, which surpassed all other study participants. The three next best participants reported, respectively: a) a 59% true positive detection rate and 3% false positive detection rate, b) a 70% true positive detection rate and 15% false positive detection rate, and c) a 66% true positive detection rate and 13% false positive detection rate.

Example 2

The inspection apparatus of the present teachings was validated for the operating range of detection at the Lawrence Berkeley National Laboratory. The sensor apparatus comprised a tunable diode laser, high resolution camera, and anemometer. In the validation, controlled leaks of 1 gram per hour, 2 grams per hour (0.05 liter per minute), 5 grams per hour, 10 grams per hour, 20 grams per hour, and 40 grams per hour were measured by the inspection apparatus according to the present teachings and it was found that accurate results were obtained at all of the foregoing leak levels. The inspection apparatus performance was verified with measurements from an extractive analyzer, the Semtech Hi-Flow, which has a lower detection threshold of about 0.03 liters per minute with an accuracy of 5% or better.

Figure 1B:
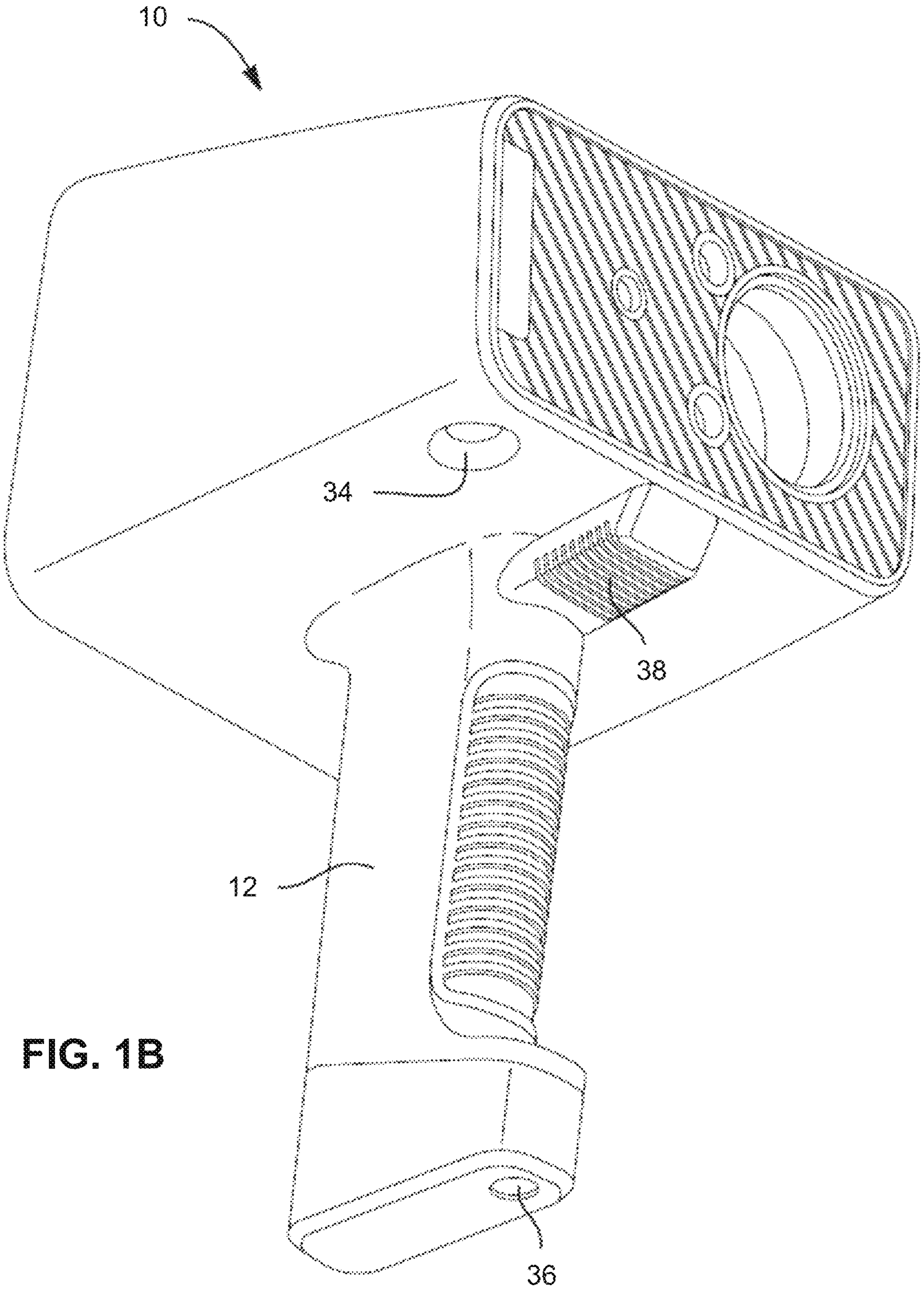
FIG. 1B is a perspective view of the inspection apparatus.

FIG. 1A and FIG. 1B shows an inspection apparatus 10 according to the present teachings. The inspection apparatus 10 is a handheld device having a handle 12 and a sensor unit 14 mounted to the handle 12. The sensor unit 14 includes a plurality of sensors 16 including a visual sensor 18, an open air optical path gas sensor 20 that comprises an emitter 22 and a receiver 24 (although the present teachings contemplate sensing technologies that integrate the separate emitter and receiver), and a microphone 26. The plurality of sensors have observation axes 28 that are generally parallel to one another and that are directed toward an object and/or region of interest for data collection.

The sensor unit 14 also includes a visible light laser 30 for aiding users in aiming the inspection apparatus 10. In this regard, the user can visualize where the plurality of sensors 16 are directed upon. The path of the visible light laser 30 is preferably generally parallel to the observation axes 28 of the plurality of sensors 16. A power button 32 is located on the top of the sensor unit 14, although the present teachings contemplate the power button 32 can be located anywhere on the sensor unit 14 and/or handle 12 that is practicable.

Figure 4:
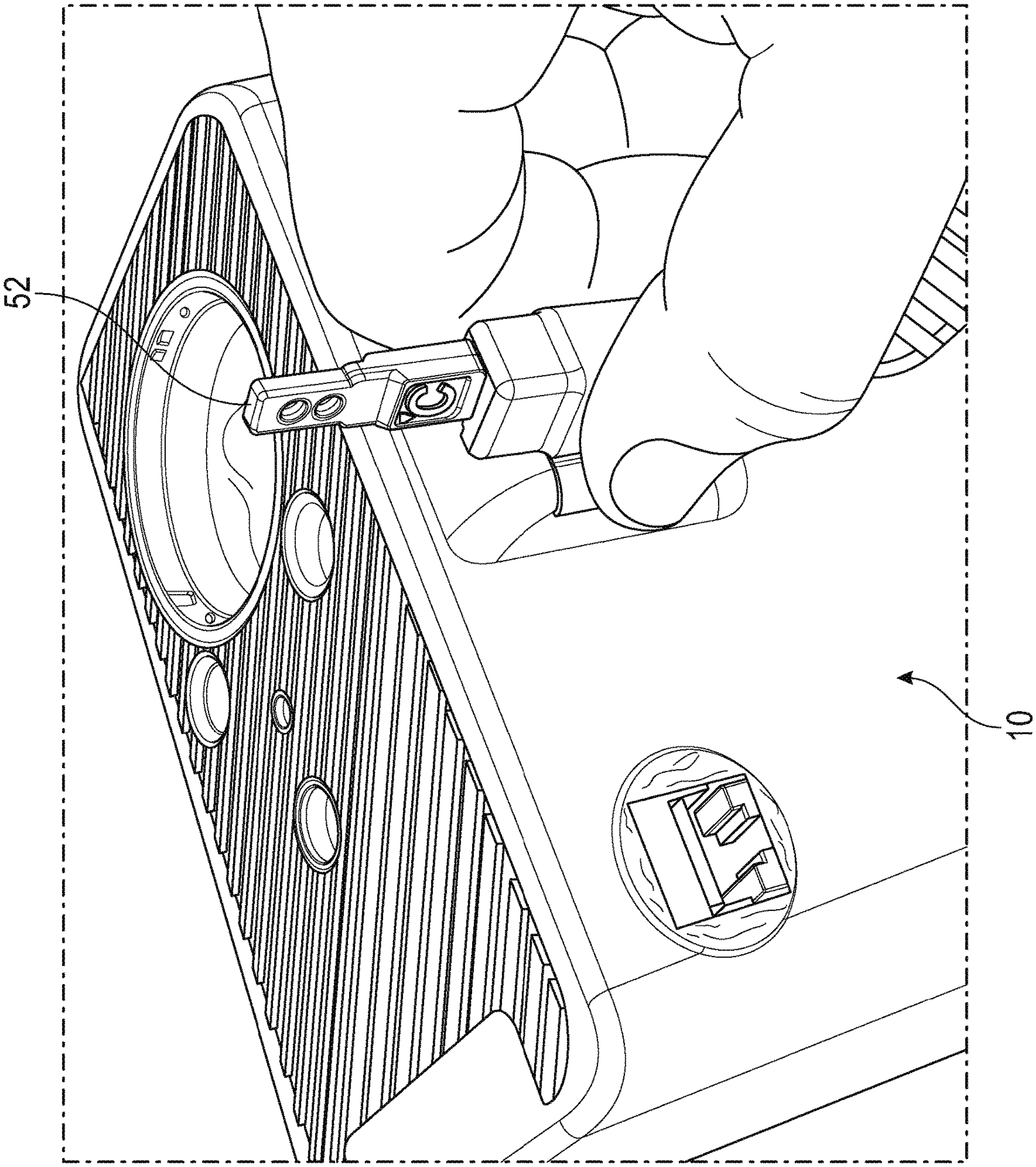
FIG. 4 is a perspective view of the inspection apparatus.

As shown in FIG. 1B, the sensor unit 14 also includes a data transmission port 34 (as shown, an ethernet port) and a power connection 36 for recharging an on-board battery (for powering the sensors, processors, graphical user interface, and the like). Underneath the sensor unit 14 and proximate to the handle 12 is located a modular access point 38 to which other sensors can be installed on the inspection apparatus 10 and through which wiring of the other sensors can pass and connect the other sensors to data transmission means and power sources. In FIG. 4, an anemometer 52 is installed on the modular access point 38, although the present teachings that any other sensors may be installed on the modular access point 38 (including redundant sensors such as a second visual sensor). It may be appreciated that the location of the anemometer 52 need not necessarily be accounted for with respect to the observation axes 28 of the plurality of sensors 16 as wind speed and direction in the general area is agnostic to the direction of the sensors 16. Although, it is generally recommended that the inspection apparatus 10 be held no more than 50 meters, more preferably no more than 40 meters, more preferably no more than 30 meters, more preferably no more than 20 meters, or even more preferably no more than 10 meters from the object(s) being observed.

Figure 2:
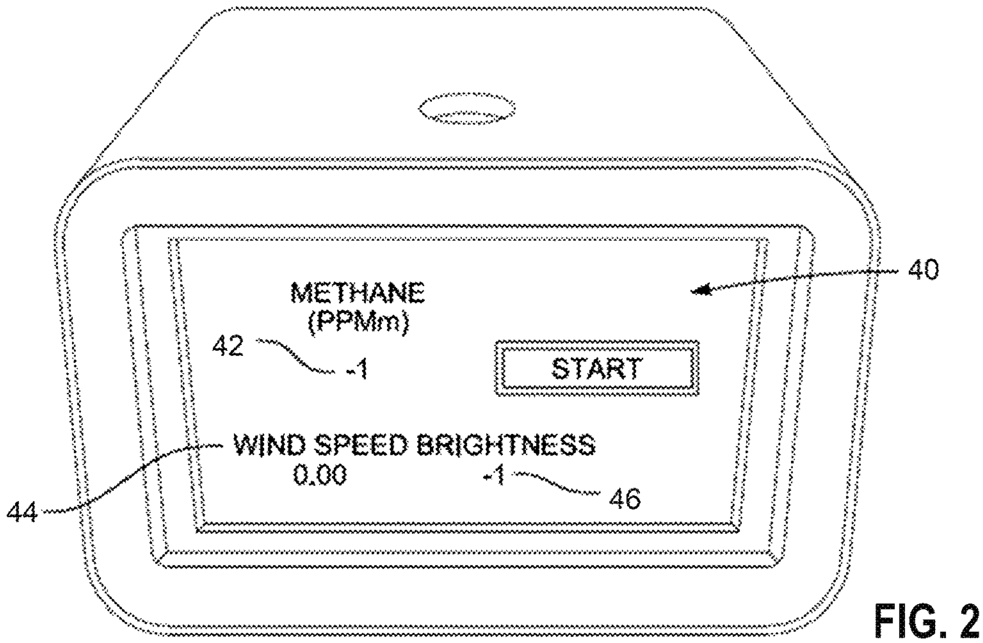
FIG. 2 is a perspective view of the inspection apparatus.

FIG. 2 shows a graphical user interface 40 on a side of the inspection apparatus 10 opposing the side on which the plurality of sensors 16 are located. The graphical user interface 40 displays the methane concentration 42 measured by the open air optical path gas sensor 20, wind speed 44 measured by an anemometer 52 (shown in FIG. 4), and brightness 46 as measured by the visual sensor 18 (brightness being relevant to the accuracy of sensor measurements relying on reflection of electromagnetic radiation).

The present teachings contemplate that the graphical user interface 40 can display any of the measurements discussed herein as well as optionally a live-feed from the visual sensor 18 (optionally with a visualization of quantitative and/or qualitative gas measurements, thermal measurements, acoustic measurements, or any combination thereof juxtaposed on the live-feed from the visual sensor 18). The graphical user interface 40 is touch-screen enabled and thus users can interact with the graphical user interface 40, such as pressing the "start" button to initiate data collection and an associated "stop" button to cease data collection. The present teachings contemplate that while data may not be collected/recorded (i.e., stored on a non-transient storage medium), the inspection apparatus 10 may operate in an observation-only mode in which instantaneous measurements are displayed for the user.

Instantaneous wind speed and/or direction, brightness, or any combination thereof may be advantageous to the user in order to properly orient the inspection apparatus 10. In some aspects, an indicated wind speed and direction can prompt the user to orient the device upstream of the wind in the event the point of origin of a leak is located upstream. In some aspects, an indicated brightness can prompt the user to perform subsequent passes of the inspection apparatus 10 or wait for ambient light conditions to change in order to obtain optimal measurements. In this regard, an excess of reflected light (e.g., from the sun) can interfere with the gas measurements discussed herein. It is also contemplated by the present teachings that various visual and/or audio indicators may be expressed to the user via the graphical user interface.

Figure 3:
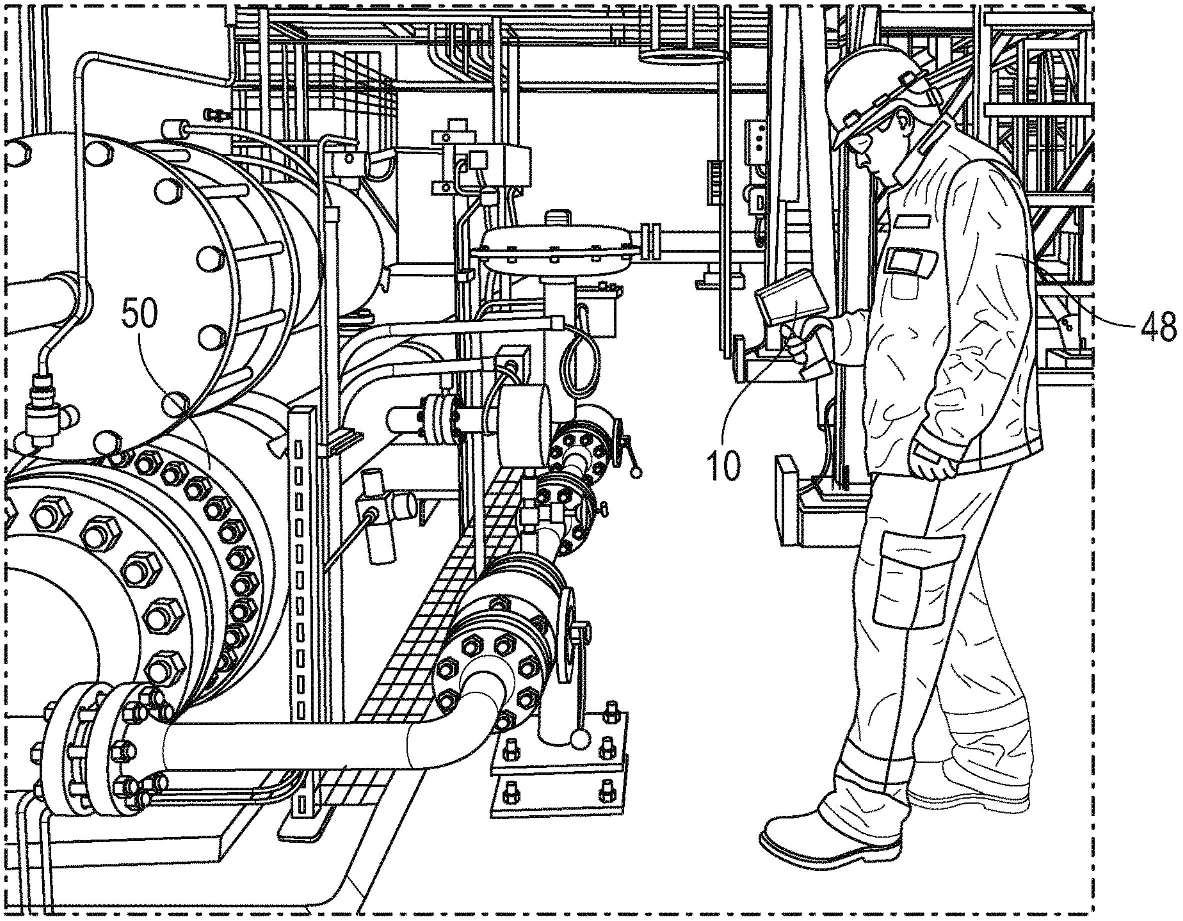
FIG. 3 illustrates the inspection apparatus in use.

FIG. 3 shows a user 48 directing the inspection apparatus 10 toward an object 50 being inspected. In typical inspection events described herein, the user 48 may walk along a path and stop at various intervals to sweep the inspection apparatus 10 through a region of the object 50. After the sweep of one region, the user 48 may move on to other regions of the object 50. It may be appreciated by the present teachings that the present inspection apparatus 10 provides for free movement of the user 48 without the need to set up stationary sensors, background reflectors, or other types of equipment.

FIG. 4 shows an anemometer 52 installed on the inspection apparatus 10. The anemometer 52 is installed at the modular access point 38 and the present teachings contemplate that other sensors, including redundant sensors, may be installed at this location as well. The anemometer 52 extends from the front of the inspection apparatus 10 to minimize or preclude hand movements or otherwise from impacting the wind interacting with the anemometer. In this example, hot wire anemometers are located within the tubes or channels formed in the protruding tab.

FIG. 5A through FIG. 6B show an exemplary 3D model 54 of an object 50 and its surroundings (i.e., the ground on which it is situated and other proximate structures/objects). One pose of the 3D model is shown, but it is understood that the 3D model can be pitched, rolled, and yawed or otherwise explored in 3D space defined by XYZ coordinates to view different poses of the 3D model (e.g., the opposing side of the object 50). The 3D model 54 is constructed from data collected by the plurality of sensors 16 shown in FIG. 1A and FIG. 1B.

In a typical inspection event, the visual sensor obtains a plurality of photograph frames (e.g., 500 or more, 1,000 or more, or even 2,000 or more) from various angles relative to one or more standing positions of the user (via the sweeping method described herein) and using photogrammetry methods described herein, a point cloud is constructed of the object 50. In this example, photogrammetry may be used to stitch various frames together to form a visual representation of the object in digital 3D space. Moreover, the plurality of photograph frames can be employed to construct a texture, which can be applied to the point cloud, and the texture can include features such as color and illuminance (including shadows 56). The texture can also be understood as including one or more surfaces of the object being observed, including sub-3-inch, sub-2-inch, or even sub-1-inch details (e.g., parting lines, grooves, bumps, hardware, and the like). The detection and visualization of shadows 56 may be particularly advantageous for thermal measurements discussed herein, as shaded regions that are generally cooled can be differentiated (via joint analysis) from what otherwise may be considered an abnormal thermal measurement.

The open air optical path gas sensor obtains a plurality of data points of gas presence and concentration, by way of directing a laser through a target gas and receiving reflected laser light (which is attenuated by the absorption of wavelength bands by the target gas) that has been reflected from surfaces of the object 50. The plurality of data points can be employed to construct a texture, which can be applied to the point cloud. The present apparatus and method may not rely on artificial background structures (e.g., reflective sheets) to be placed behind the object. By the visualization techniques discussed herein, gas measurements may be digitally projected onto 3D models of the objects themselves and by sweeping the inspection apparatus 10 over various regions of an object 50 a comprehensive detection and quantification of gas may be obtained. The present method is unique by focusing on concentration measurements obtained by reflection off of the objects and focus is drawn to this data rather than plumes extending into the atmosphere.

The data from the visual sensor and the open air optical path gas sensor is correlated to the same object observed at any given time by the sensors by correlating location coordinates, time-stamping, or both. In this regard, during an inspection event many regions of one object or many various objects may be inspected, and correct correlation of data must be performed in order to construct the 3D model 54 with visual data and gas data (and optionally other types of data discussed herein) juxtaposed onto the same 3D model. Furthermore, the positional offset of the sensors is corrected for such that the observation axes of the sensors are aligned (digitally) to a single line of reference, and the positional offset is not reflected in the 3D model (i.e., presenting as “shifts” of different textures). It may be appreciated by the present teachings that misalignment of data may result in the inaccurate location of sources of fugitive gases and possibly errors in the accurate construction of the 3D models.

The data from the visual sensor and the open air optical path gas sensor is collocated to attribute 3D coordinates to both types of data. In this regard, the method described herein does not rely merely on the overlaying or otherwise “shifting” or “fitting” of images derived from the visual sensor with images derived from the open air optical path gas sensor (and optionally other sensors described herein), which can be subject to positional shifts that result in inaccuracies in the 3D model. The method described herein may be more robust by attributing 3D coordinates to data points in a data set (e.g., a data set obtained from a visual sensor and a data set obtained from an open air optical path gas sensor) such that data points having corresponding 3D coordinates can be mapped to the 3D model. In some aspects, mapping may be performed in a downstream process such as on a laptop or desktop computer after having the data uploaded thereon, although the present teachings contemplate that the same can be performed on-board the inspection apparatus.

In this regard, collocation may be understood in the sense that visual images can be expressed as a pixel array on an XY coordinate system and with the pre-determined positioning of the open air optical path gas sensor relative to the visual sensor, the location or region on the object that the laser observes can be correlated to the coordinates on the pixel array. Moreover, the depth or Z coordinates of a visual image as determined by the photogrammetry methods described herein or otherwise (e.g., stereo cameras and/or LIDAR) can similarly be attributed to the gas data. Thus, non-visual data points described herein (e.g., quantitative data points for gas concentration, heat, acoustic frequency, and the like) may be individually assigned 3D coordinates such that they can be accurately mapped to a 3D model.

It may be understood by the present teachings that an inspection data set may comprise a plurality of overlapping or duplicate data points for a single 3D coordinate. Thus, duplicate data may be recognized and discarded.

The present examples present gas data but the present teachings contemplate that the above description can be applied similarly to data from thermographic cameras, microphones, or both.

The texture comprising the gas data is presented as a heat map, where brighter regions indicate higher gas concentrations than darker regions. It is also understood that the heat map may be visually displayed in color with various colors (e.g., red, green, and blue) and hues thereof corresponding to gas concentrations. As depicted, there are generally five main regions A-E in the heat map with the highest gas concentration in region A and progressively less gas concentrations in regions B-E. The source(s) of the gas leak can be determined from the heat map in terms of where the highest concentration of gas is present or at least proximate thereto (given contextual wind data as well as the common knowledge of operators who may understand the likely escape routes for gases). As depicted the pipe running vertically along the cylindrical tank and terminating just above the tank has the highest concentration of gas at the termination point just above the tank and progressively lesser concentration the further from the termination point of the pipe.

In this regard, it may be appreciated that wind data plays a role in the analysis. Absent wind, one might expect the gas concentrations in FIG. 5A and FIG. 5B to be generally symmetrically disposed around the point of origin of the gas leak. However, as depicted, the geometry of the gas plume is shifted rightward of the point of origin, due to a generally left-to-right direction of the wind with respect to the depicted XYZ orientation of the 3D model in digital space. In another example, FIG. 6A and FIG. 6B show a generally symmetrical distribution of gas concentration regions A-C around the point of origin within region A, thus, wind is not manipulating the fugitive gas plume to the same degree as in FIG. 5A and FIG. 5B. One or a plurality of vectors conveying wind speed and direction may be provided as a texture that can be visualized on the 3D model.

In these examples, it may be appreciated that the objects themselves function as the background reflector and the gas concentration measurements are projected onto the 3D model of the object. In this regard, the present devices and method distinguishes from conventional methods of gas detection which are more concerned with visualizing gas in real-time rather than modeling and providing more robust visualization and analysis techniques described herein.

Typically, facilities have stairs and elevated walkways (as well as other elevated vantage points) that provide visual access to different angles of objects from which gas may emanate. This is particularly the case for facilities that have vertically-extending equipment such as tall tanks and vertically extending pipelines that extend 5 meters or more, 10 meters or more, 15 meters or more, 20 meters or more, 25 meters or more, or even 30 meters or more from the ground. Users can traverse these features to view different angles of objects. The present teachings also contemplate other aerial viewing means such as aerial drones for obtaining different views of objects. The aerial viewing means may be employed alone or together with the hand-held aspect of the present inspection apparatus. The aerial viewing means may comprise several or all of the componentry/features on-board the inspection apparatus. Elevated vantage points may be advantageous for obtaining a complete 3D model, although the same is not necessarily required.

As shown in FIG. 6A, an elevated walkway is provided proximate to the tanks. While the 3D model is viewed from a pose distant from the objects, the 3D model can be rendered from sensor observations taken from the ground and the elevated walkway, as well as aerial methods.

Figure 5A:
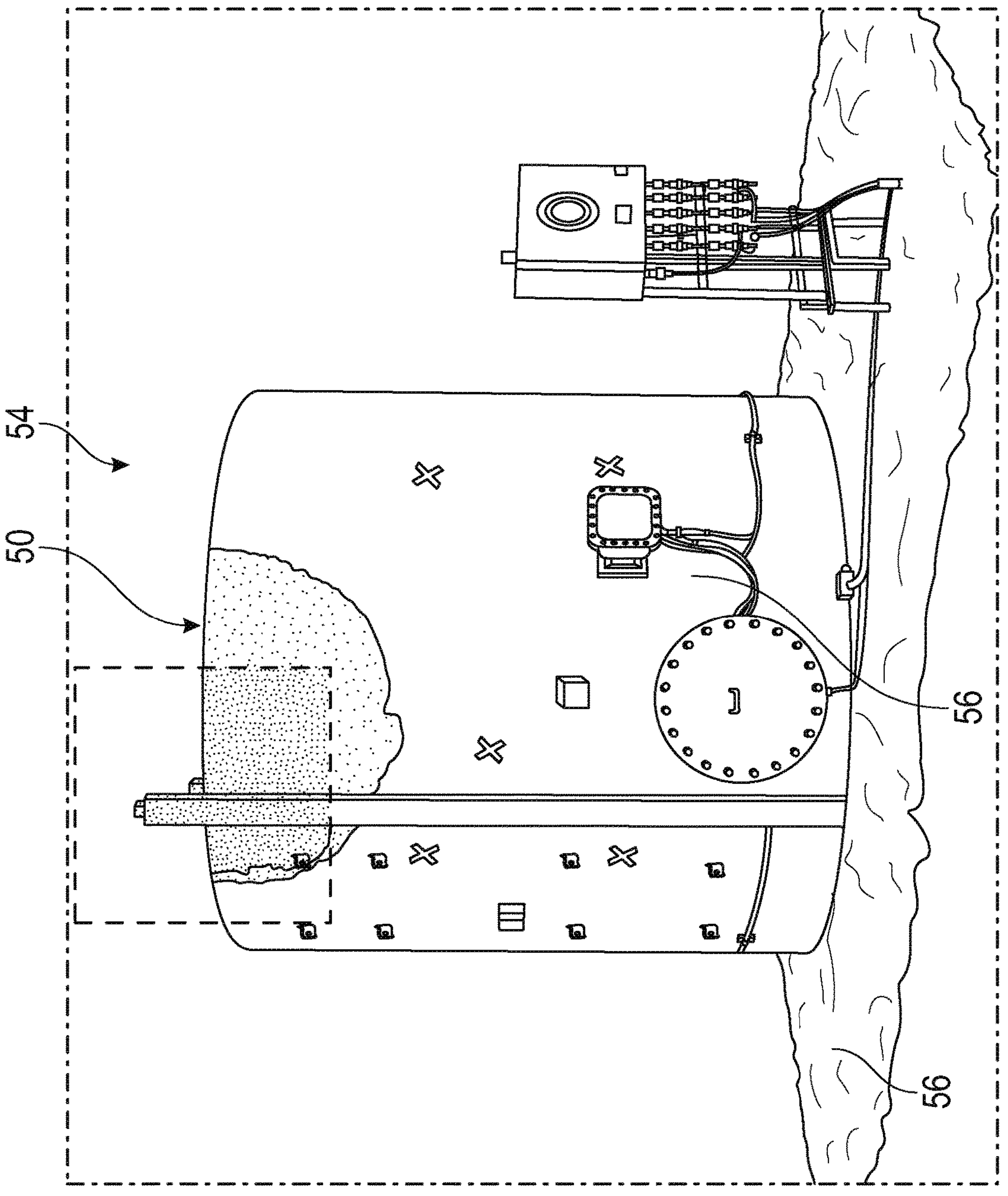
FIG. 5A illustrates a 3D model.
Figure 5B:
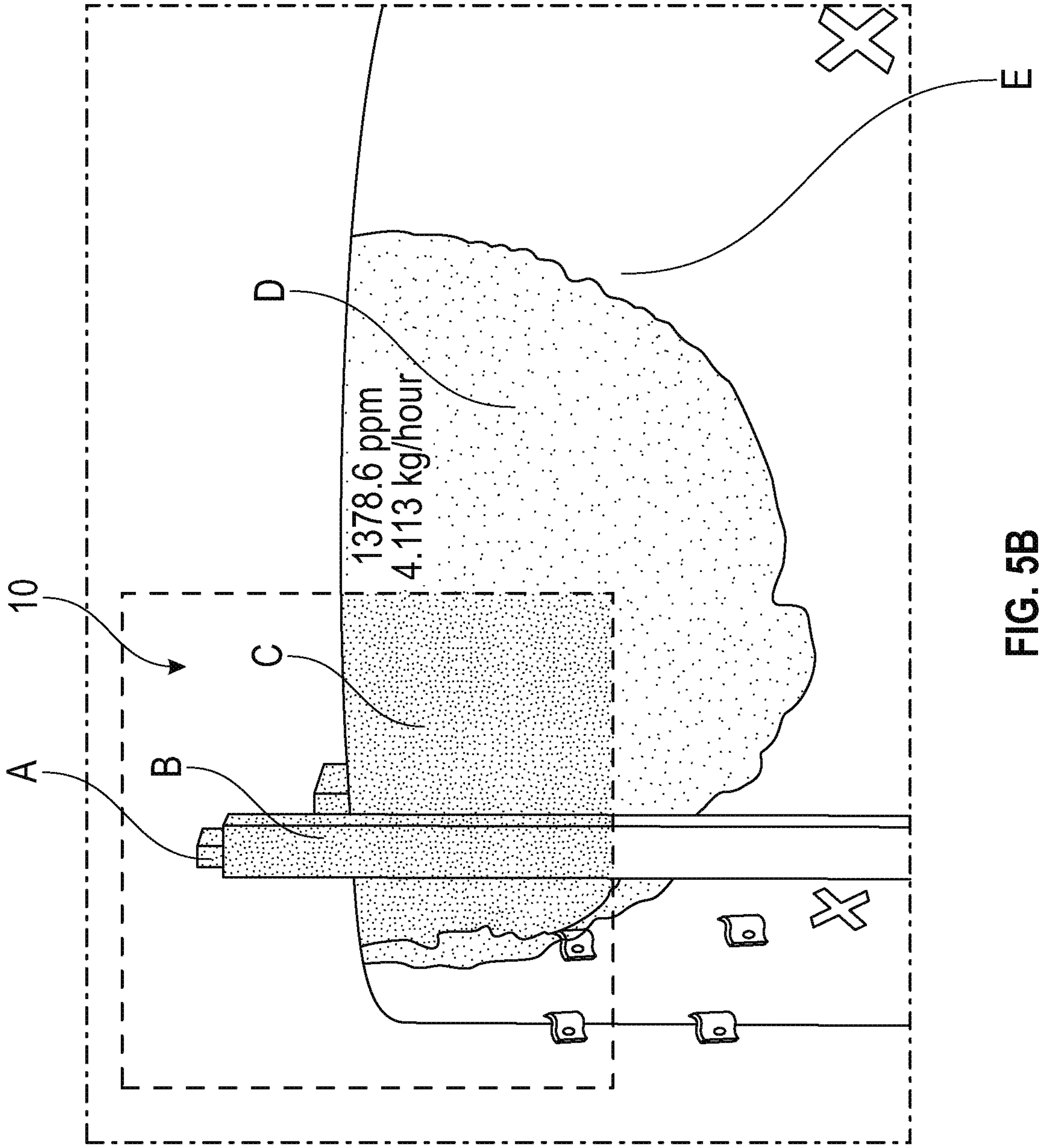
FIG. 5B illustrates a 3D model.
Figure 6A:
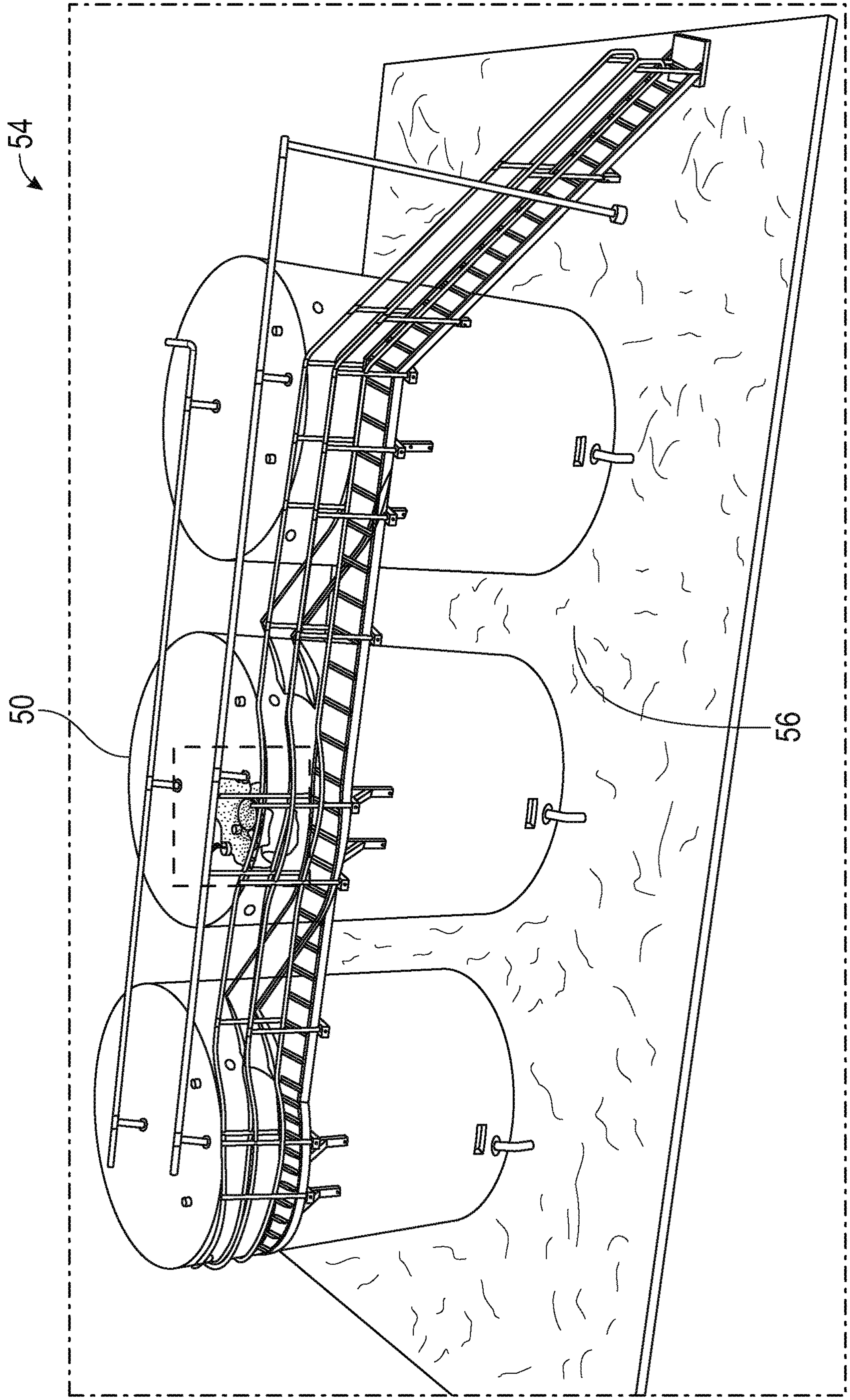
FIG. 6A illustrates a 3D model.
Figure 6B:
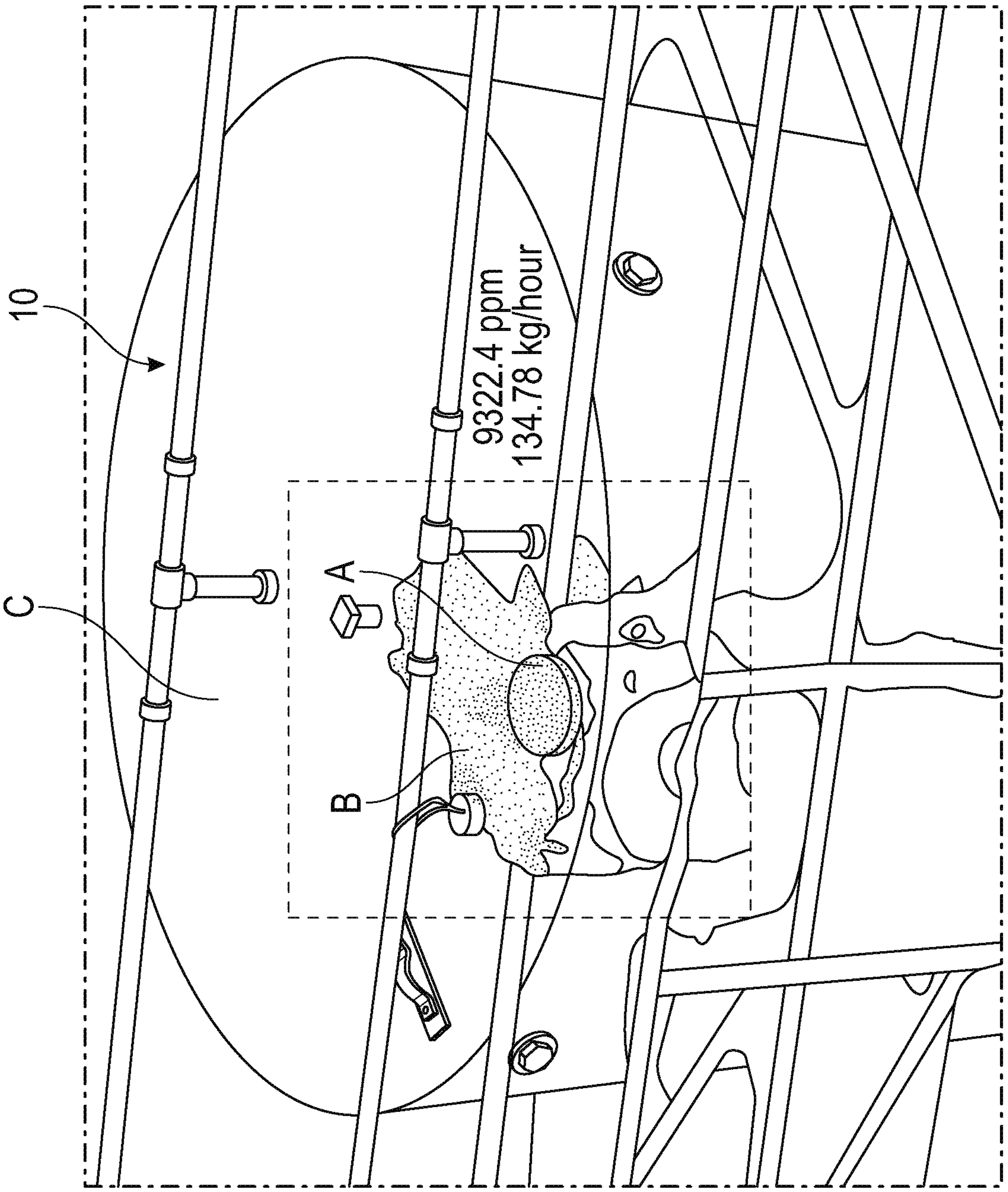
FIG. 6B illustrates a 3D model.
Figure 7A:
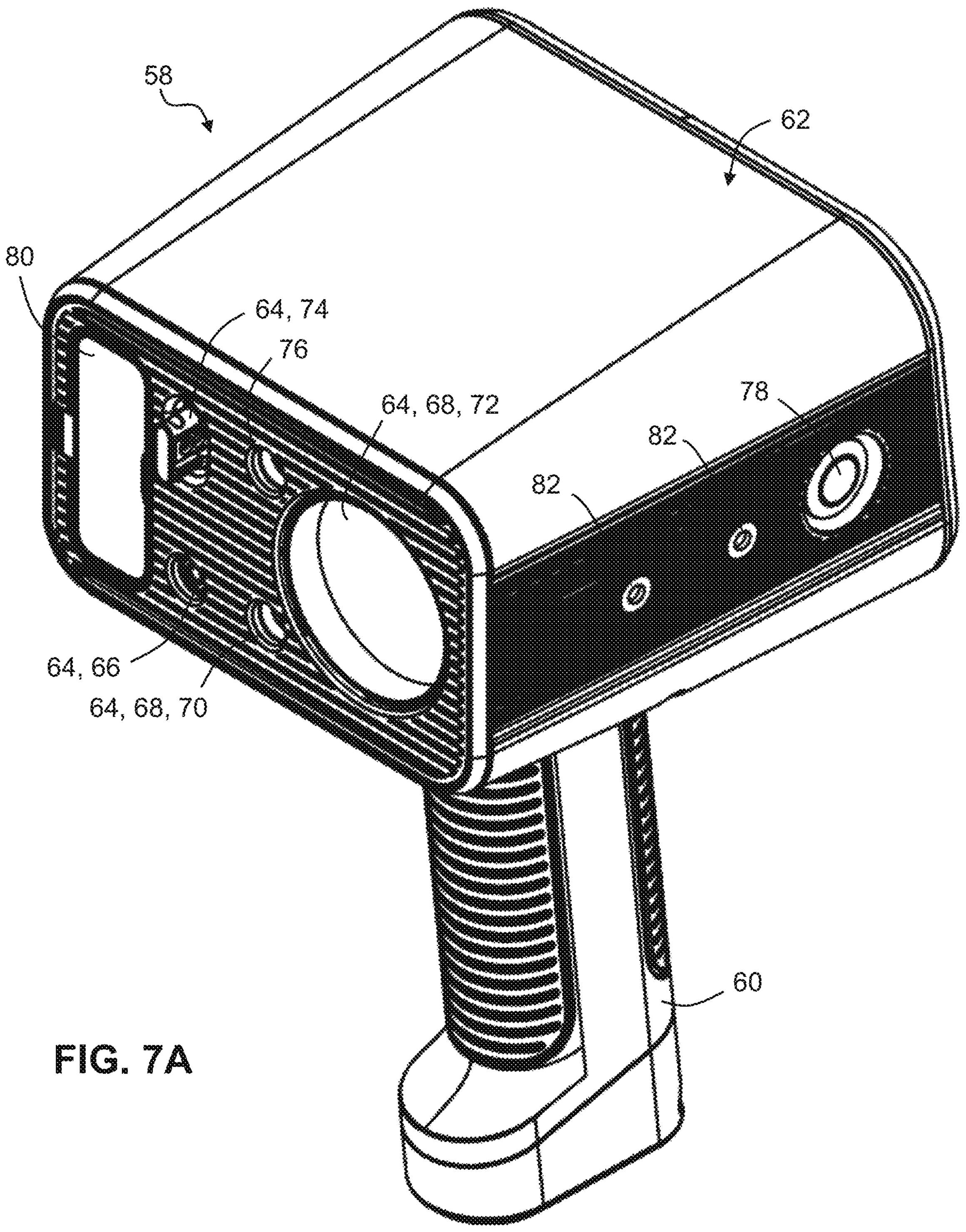
FIG. 7A is a perspective view of an inspection apparatus.
Figure 7B:
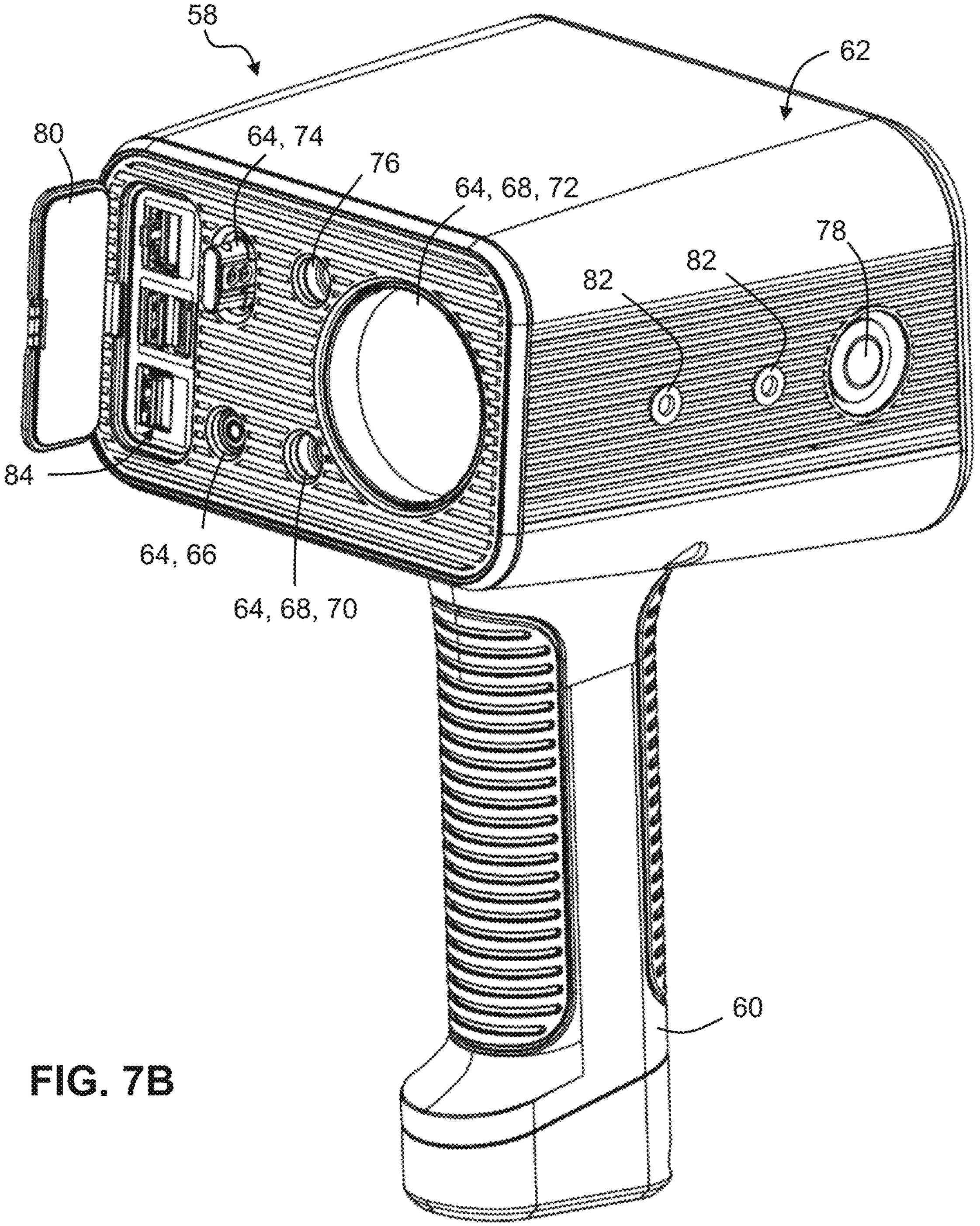
FIG. 7B is a perspective view of the inspection apparatus.
Figure 7C:
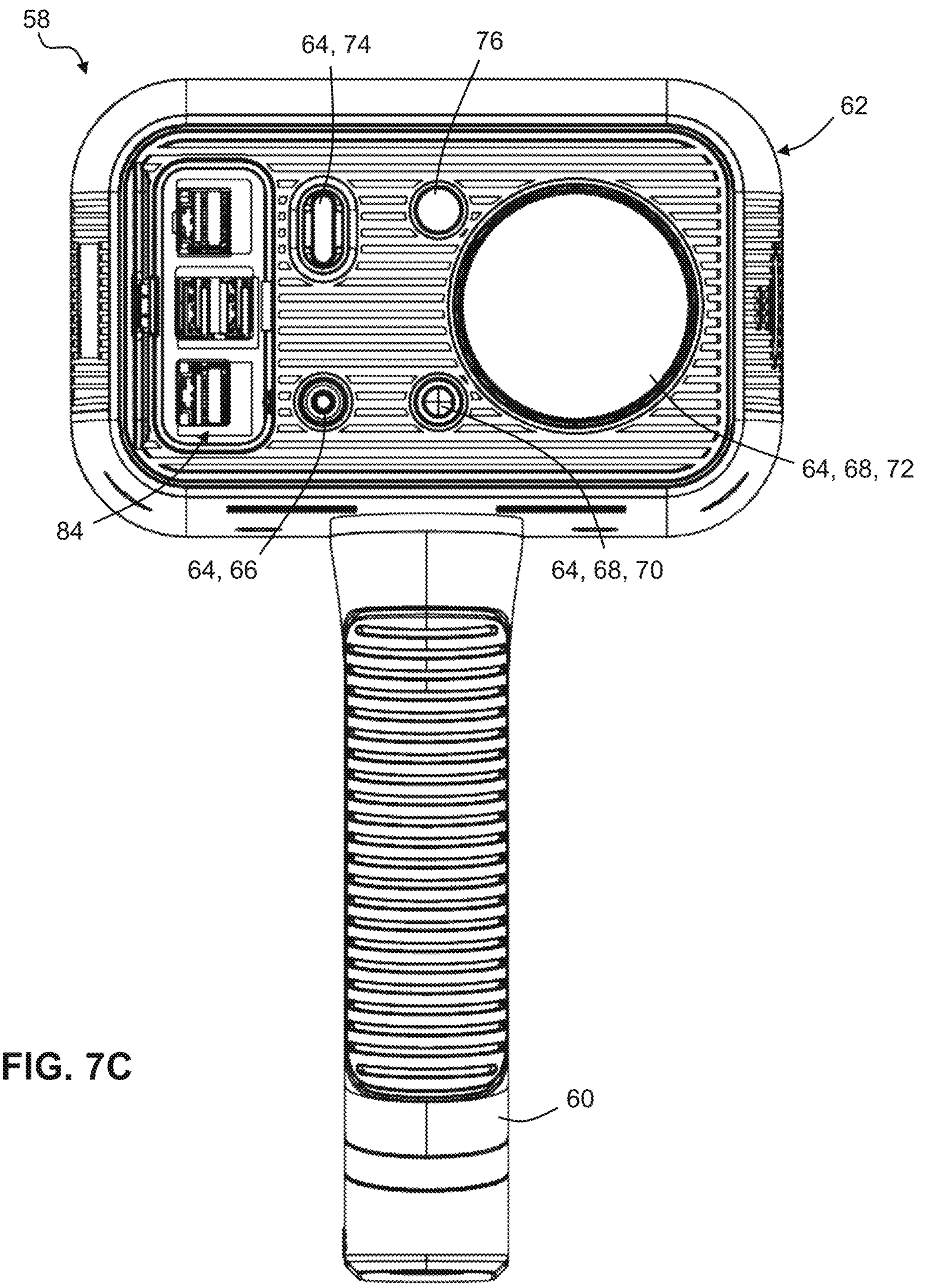
FIG. 7C is a front plan view of the inspection apparatus.
Figure 7D:
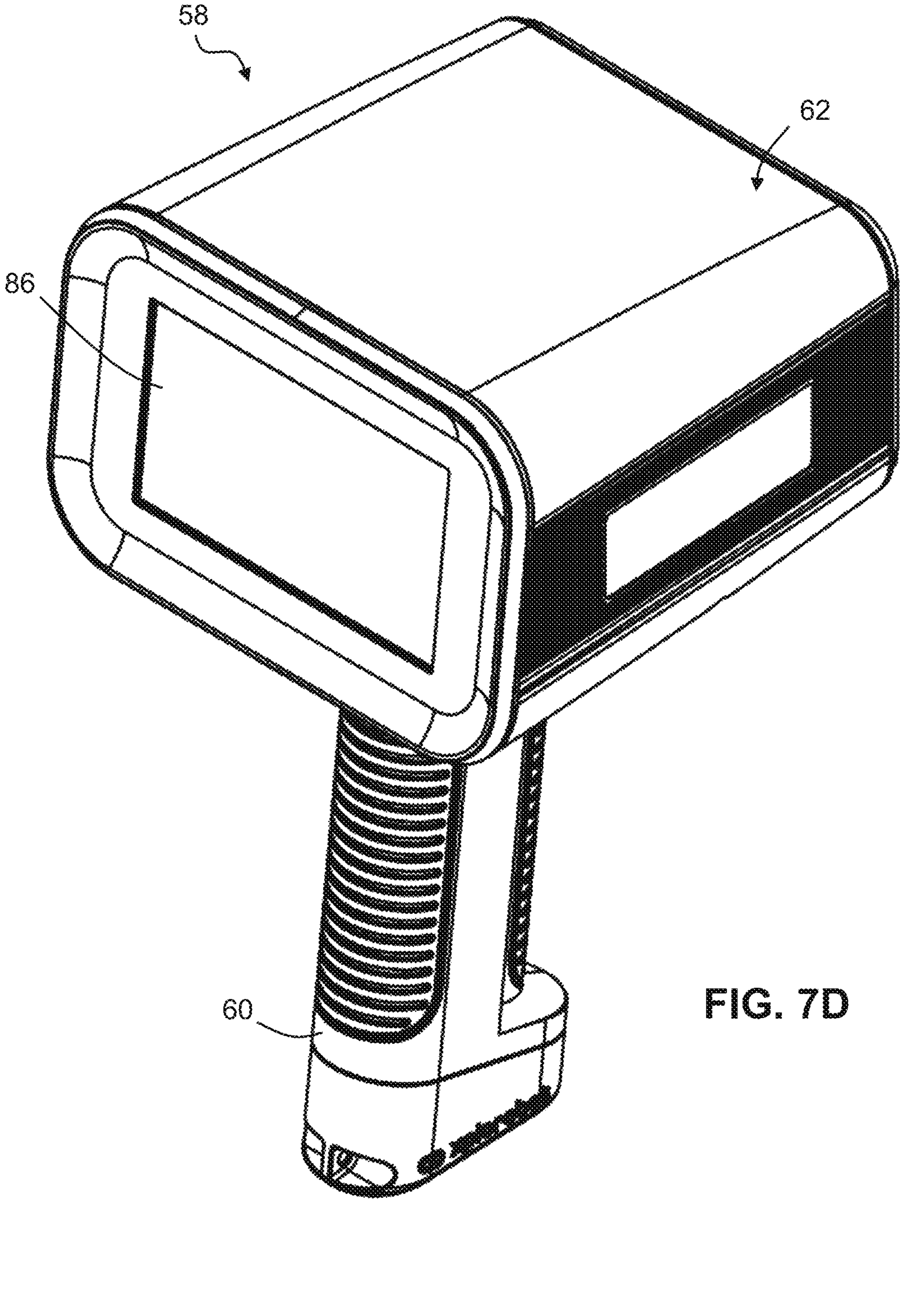
FIG. 7D is a perspective view of the inspection apparatus.
Figure 7E:
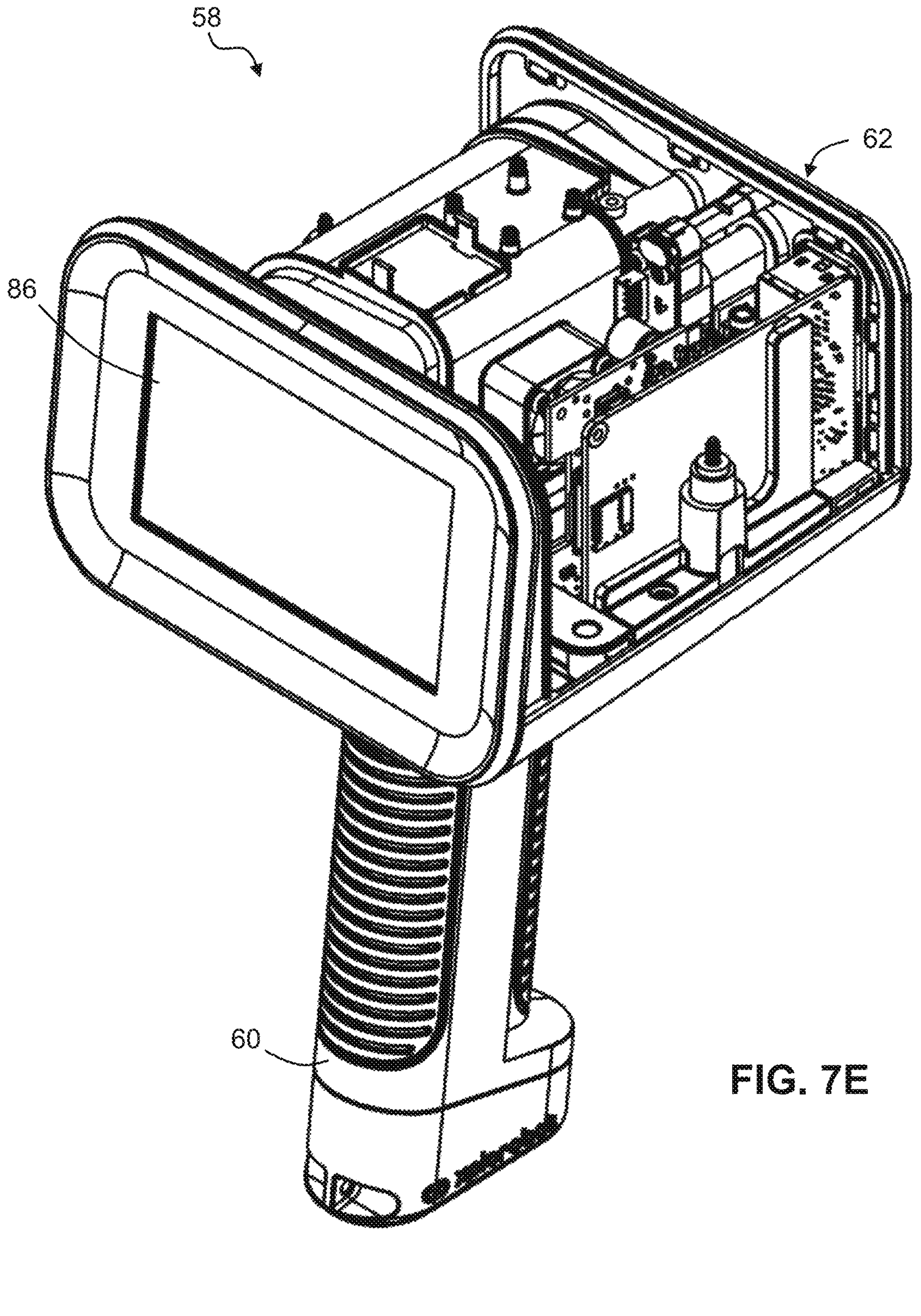
FIG. 7E is a perspective view of the inspection apparatus.
Figure 7F:
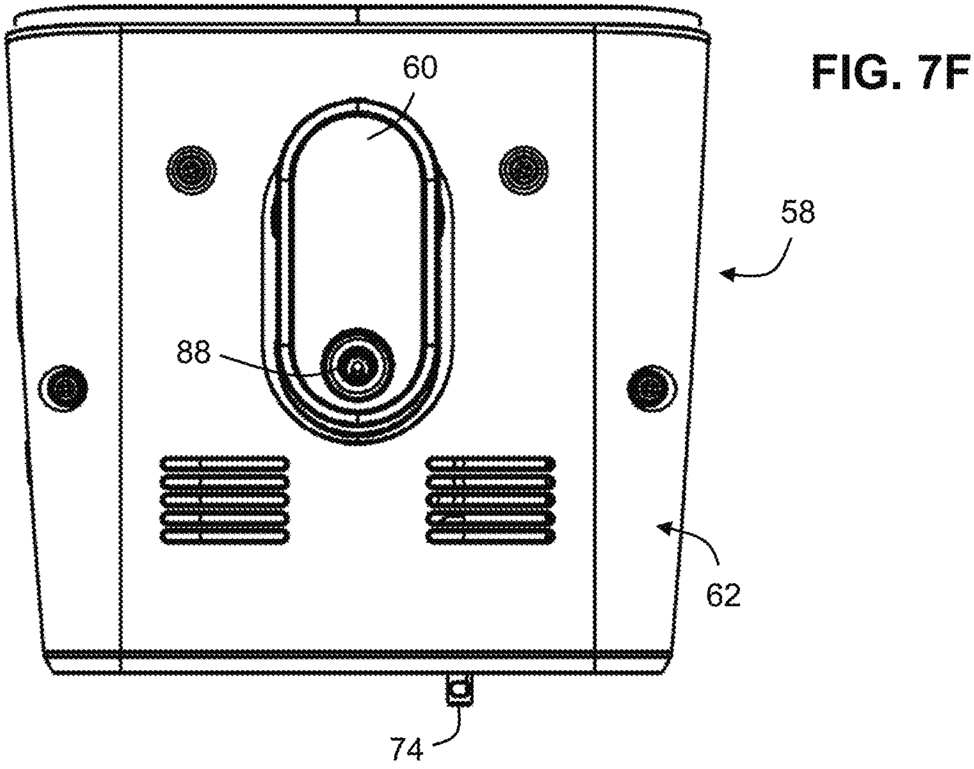
FIG. 7F is a bottom plan view of the inspection apparatus.
Figure 7G:
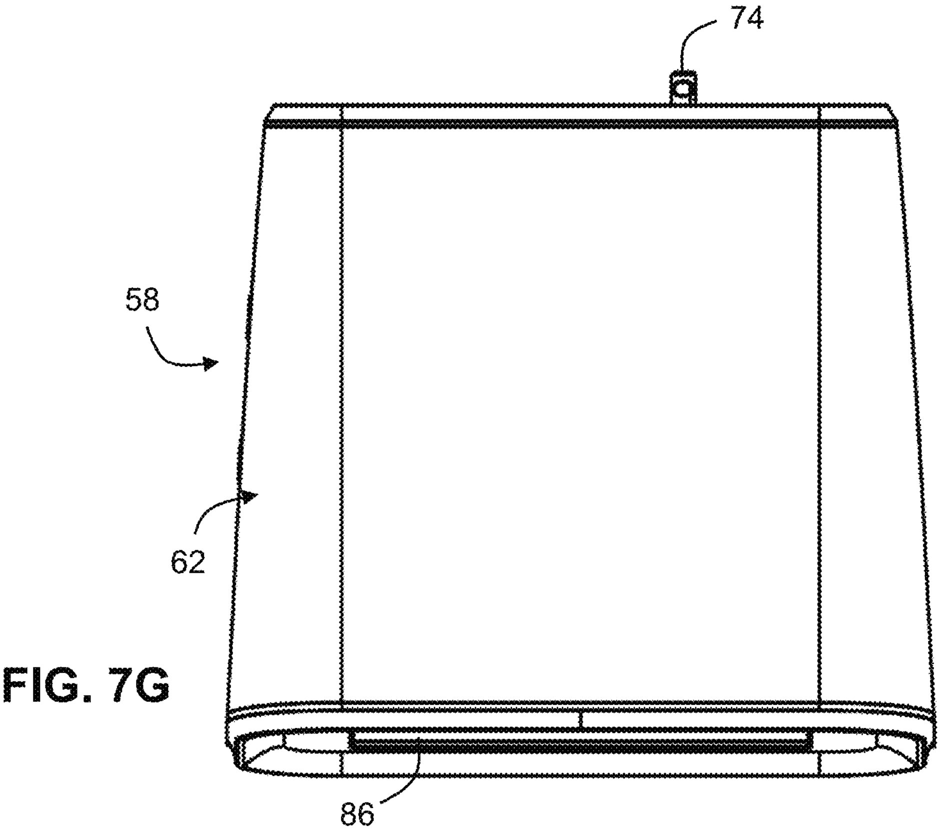
FIG. 7G is a top plan view of the inspection apparatus.
Figure 7H:
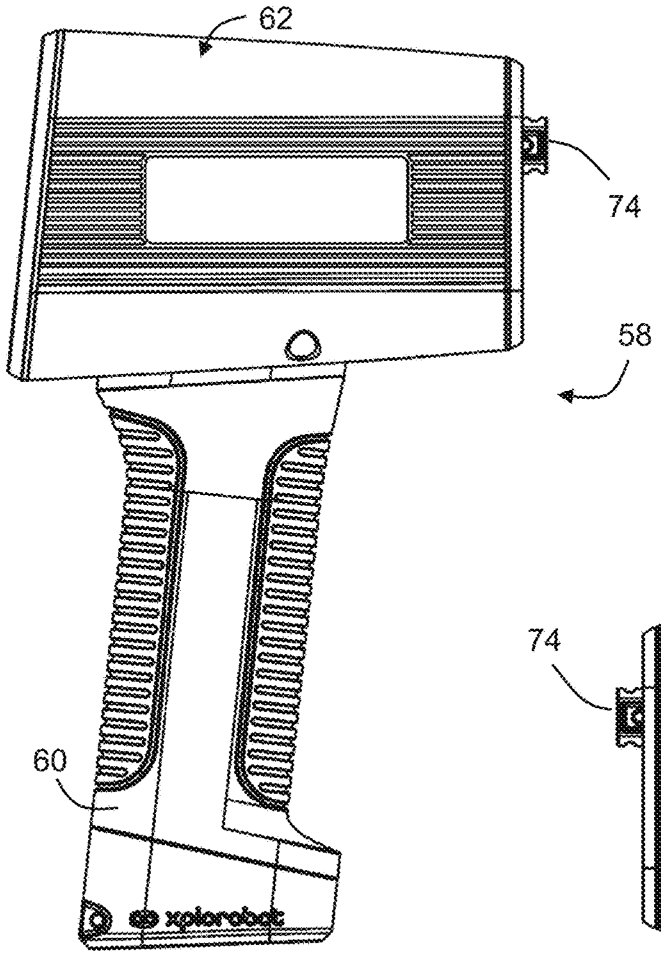
FIG. 7H is a side plan view of the inspection apparatus.
Figure 7I:
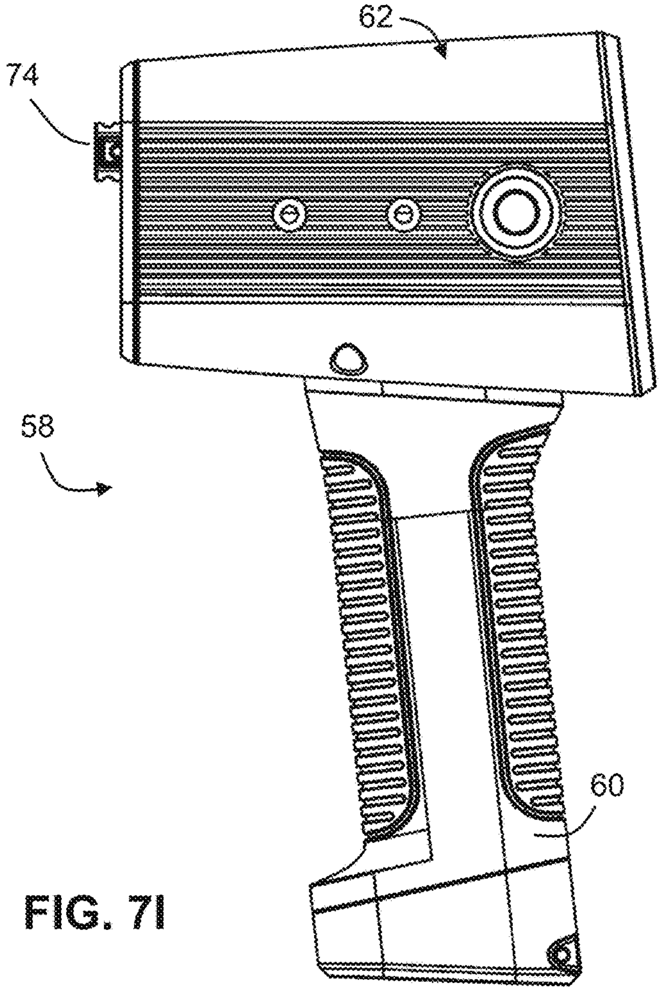
FIG. 7I is a side plan view of the inspection apparatus.

FIG. 5B and FIG. 6B show a boundary around the point of origin of the leak. The boundary may be drawn by users through modelling software or may be autonomously drawn based on a set of pre-determined rules. Within the boundary, the data points may be analyzed to determine a peak concentration and an emission rate. This analysis may be advantageous for triaging repair activities throughout a facility whereby some repairs may be prioritized over others. For example, peak concentration may be of particular interest for flammable gasses that have ignition characteristics at a certain atmospheric concentration and emission rate may be of particular interest where product loss or environmental standards are of concern. In some aspects, leaks of a minor nature may be known and monitored over time to determine if they are of growing concern. By the unique and unconventional device of the present teachings, the emission rate may be determined by the concentration measurements of a fugitive plume as well as considering wind speed and direction to model gas dispersion.

FIG. 7A through FIG. 7I illustrate an inspection apparatus 58. The inspection apparatus 58 comprises a handle 60 and a sensor unit 62. The sensor unit 62 comprises a plurality of sensors 64. The plurality of sensors 64 include a visual sensor 66, an open air optical path gas sensor 68 including an emitter 70 and a receiver 72, and an anemometer 74. The plurality of sensors 64 are forward-facing on the inspection apparatus 58 such that a user points the inspection apparatus 58 at an object or region of interest to take measurements of the same. In this regard, the inspection apparatus 58 comprises a visible light laser 76 that projects a visible light upon the object or region of interest, thus aiding the user in aiming the inspection apparatus 58.

The visual sensor 66 may be adjustable such that an observation axis of the visual sensor 66 may generally align with an observation axis of the open air optical path gas sensor 20.

The anemometer 74 may be retractable into the inspection apparatus 58. Retraction and extension may be effectuated by manual or mechanical means. During operation of the inspection apparatus 58, the anemometer 64 may extend from the inspection apparatus 58 to be exposed to wind.

The inspection apparatus 58 comprises a door 80 on the front end thereof to cover one or more data transmission ports 84 and prevent water and/or debris ingress. The one or more data transmission ports 84 may include one or more USB ports (e.g., two or more, three or more, or even four or more USB ports), one or more ethernet ports, or both.

The inspection apparatus 58 comprises a power button 78 for turning the inspection apparatus 58 on or off. The inspection apparatus comprises one or more (e.g., two) modular access points 82 for attaching accessories. The accessories may include additional sensors, lights (e.g., flood lights to aid in visibility), or the like.

The inspection apparatus 58 comprises a graphical user interface 86 on the rear of the inspection apparatus 58. A user may view real-time measurements, view a real-time video feed, control the inspection apparatus 58, or any combination thereof via the graphical user interface 86.

The handle 60 comprises a power connection 88 at the bottom thereof, although the present teachings are not intended to be limited to any particular location of the power connection 88. The inspection apparatus 58 may comprise an on-board battery chargeable via the power connection 88.

Figure 8:
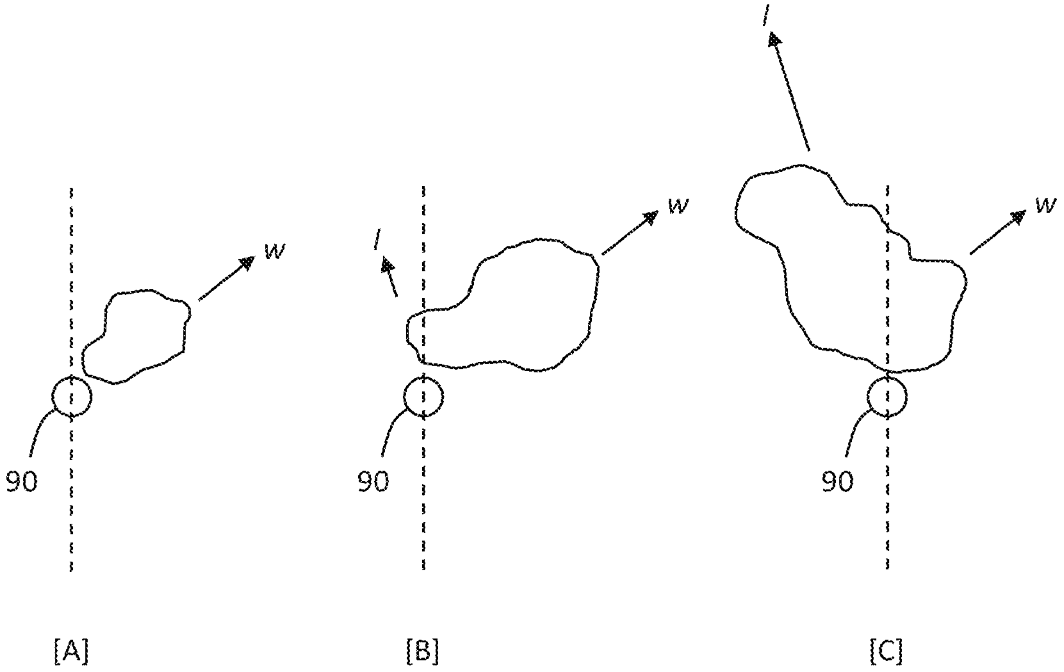
FIG. 8 illustrates exemplary buoyancy, dispersion, and jet models described herein.

FIG. 8 illustrates exemplary fugitive plumes 90 fitting the buoyancy, dispersion, and jet models. The illustrations are not intended to be limiting, as one may appreciate from the present teachings that fugitive plume geometry can be complex and take many forms. The fugitive plume 90 of [A] corresponds to the buoyancy model, the fugitive plume 90 of [B] corresponds to the dispersion model, and the fugitive plume 90 of [C] corresponds to the jet model. The wind vectors (w) are equal in directionality and magnitude. The leak vectors (l) are equal in directionality but different in magnitude. Fugitive plume [A] does not include a leak vector (l) as it is assumed negligible, although typically all leaks may have a directionality and velocity at their point of origin 90.

FIG. 8 shows that generally the models may be distinguished by the relative effects of the leak vector (l) and the wind vector (w) upon the fugitive plume 90. The dashed lines extending through the points of origin 90 are provided as visual aids. [A] shows that the geometry of the fugitive plume 90 is determined by the wind vector (w). [B] shows that the geometry of the fugitive plume 90 is primarily determined by the wind vector (w) and is relatively less influenced by the leak vector (l). [C] shows that the geometry of the fugitive plume 90 is primarily determined by the leak vector (l) and is relatively less influenced by the wind vector (w).

Figure 9:
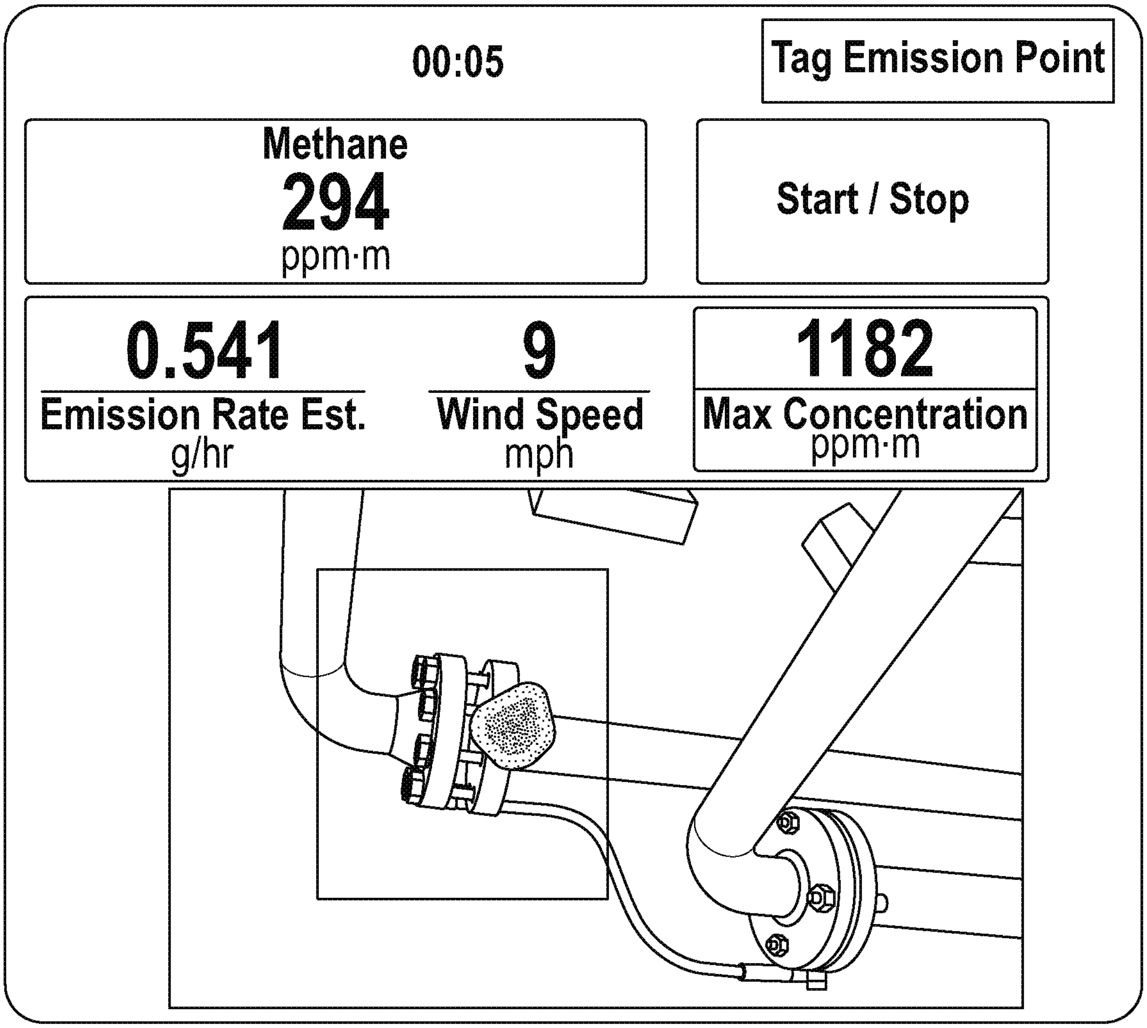
FIG. 9 illustrates a graphical user interface associated with a digital emissions tag.

FIG. 9 illustrates a digital emissions tag, as described herein. The digital emissions tag can be viewed on a graphical user interface of the inspection apparatus. The digital emissions tag can be initiated by a start button on the graphical user interface and data collection thus begins. Methane concentration, emissions rate, wind speed, maximum methane concentration, and a video feed is recorded. A visualization of the region of interest is provided on the graphical user interface with a visualization of a fugitive plume juxtaposed thereon. Data recordation is tracked by a timer. At the end of data collection, the digital emissions tag can be ceased by a stop button on the graphical user interface and the digital emissions tag can be memorialized by a tag button on the graphical user interface.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value is from 1 to 90, from 20 to 80, or from 30 to 70, it is intended that intermediate range values (such as for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. Unless otherwise stated, all ranges include both endpoints.

The use of "about" or "approximately" in connection with a range applies to both ends of the range. Thus, "about 20 to 30" is intended to cover "about 20 to about 30", inclusive of at least the specified endpoints.

The terms "generally" or "substantially" to describe measurements may mean about +/−10° or less, about +/−5° or less, or even about +/−1° or less. The terms "generally" or "substantially" to describe measurements may mean about +/−0.01° or greater, about +/−0.1° or greater, or even about +/−0.5° or greater.

REFERENCE NUMERALS

10 inspection apparatus
12 handle
14 sensor unit
16 plurality of sensors
18 visual sensor
20 open air optical path gas sensor
22 emitter
24 receiver
26 microphone
28 observation axes
30 visible light laser
32 power button
34 data transmission port
36 power connection
38 modular access point

40 graphical user interface
42 methane concentration
44 wind speed
46 brightness
48 user
50 object
52 anemometer
54 3D model
56 shadows
58 inspection apparatus
60 handle
62 sensor unit
64 plurality of sensors
66 visual sensor
68 open air optical path gas sensor
70 emitter
72 receiver
74 anemometer
76 visible light laser
78 power button
80 door
82 modular access point
84 data transmission port
86 graphical user interface
88 power connection
90 fugitive plume
92 point of origin

The invention claimed is:

1. A handheld inspection apparatus configured to be operated by a human user, the handheld inspection apparatus comprising:

a plurality of sensors including:

a tunable diode laser and a photodetector configured to perform tunable diode laser absorption spectroscopy;

a visible light sensor configured to detect visible light and produce visual image data for visible light images each having an array of pixels; and at least one anemometer configured to generate wind speed data;

at least one processor configured to receive signals from the plurality of sensors, and configured to generate, from signals received from the photodetector, real-time gas concentration visual heat map data providing a plurality of different textures and/or colors representing different gas concentrations;

a visible light laser configured to produce a beam parallel to a central observation axis of the tunable diode laser, wherein the visible light laser is configured to aid the human user in aiming the inspection apparatus;

a memory;

wherein the handheld inspection apparatus is configured to generate and store in the memory a plurality of digital emission tags, each corresponding to a gas emission source location and comprising: the visual image data, the real-time gas concentration visual heat map data, the wind speed data, and date and time data.

2. The handheld inspection apparatus of claim 1, wherein the tunable diode laser, the photodetector, and the visible light sensor are arranged in or on a single sensor unit.

3. The handheld inspection apparatus of claim 1, wherein the plurality of sensors further comprises a temperature sensor, and wherein the plurality of digital emission tags further comprise ambient temperature data.

4. The handheld inspection apparatus of claim 1, wherein the plurality of sensors further comprises a global positioning system (GPS) module configured to produce GPS location data, and wherein the plurality of digital emission tags further comprise the GPS location data in combination with data indicative of pose of the handheld inspection apparatus.

5. The handheld inspection apparatus of claim 1, wherein the at least one anemometer extends from a front of the handheld inspection apparatus and protrudes past other sensors of the plurality of sensors.

6. The handheld inspection apparatus of claim 5, wherein the at least one anemometer includes a first anemometer and a second anemometer, with the second anemometer being oriented perpendicular to the first anemometer.

7. The handheld inspection apparatus of claim 1, wherein the at least one processor is configured to generate location data from communication signals received from one or more cellular phone towers, and wherein the plurality of digital emission tags further comprise the location data.

8. The handheld inspection apparatus of claim 1, wherein the at least one processor is configured to generate location data from the visual image data, and wherein the plurality of digital emission tags further comprise the location data.

9. The handheld inspection apparatus of claim 1, wherein the at least one processor is configured to perform photogrammetry utilizing the visual image data to infer a distance from the handheld inspection apparatus to an object or region being observed.

10. The handheld inspection apparatus of claim 1, wherein the at least one processor is configured to perform photogrammetry utilizing the visual image data to generate a point cloud and a 3D texture of the visual image data.

11. The handheld inspection apparatus of claim 1, wherein the visible light sensor comprises at least one of an RGB camera and a stereo camera.

12. The handheld inspection apparatus of claim 1, further comprising a display configured to provide a graphical user interface, wherein the graphical user interface is configured to display a real-time gas concentration visual heat map.

13. The handheld inspection apparatus of claim 1, further comprising a wireless data transmission module configured to wirelessly transmit one or more digital emission tags to a data storage device remote from the handheld inspection apparatus.

14. A method for operating the handheld inspection apparatus according to claim 1, the method comprising:

scanning an object or region to be inspected, the scanning comprising sweeping, by a user, the handheld inspection apparatus across an object or region in generally parallel paths;

generating, with the handheld inspection apparatus, one or more digital emission tags for a gas emission source location detected in or on the object or region to be inspected, wherein each digital emission tag corresponds to a gas emission source location and comprises: visual image data, real-time gas concentration visual heat map data, date and time data, and wind speed data; and storing the one or more digital emission tags in the memory of the handheld inspection apparatus.

15. The method of claim 14, wherein the scanning of an object or region to be inspected is performed by the user when the handheld inspection apparatus is located at a distance of no more than 15 meters from the object or region to be inspected.

16. The method of claim 14, wherein the scanning is performed while the user is walking within view of the object or region to be inspected.

17. The method of claim 14, further comprising utilizing the at least one processor to perform photogrammetry on the visual image data to generate a point cloud and a 3D texture of the visual image data.

18. The method of claim 14, further comprising transmitting the one or more digital emission tags to a data storage device remote from the handheld inspection apparatus.

19. The method of claim 14, further comprising validating illuminance with the visible light sensor to determine if the illuminance is within a pre-determined operating range for the optical gas imager.

20. The method of claim 14, further comprising performing a time-lapse analysis by comparing the data from a current inspection event to data from a prior inspection event for a same object or region to be inspected.

21. The method of claim 14, further comprising aiming, by the user, the handheld inspection apparatus utilizing the visible light laser to provide visible indication of where the plurality of sensors are aimed.

22. The handheld inspection apparatus of claim 1, wherein each digital emission tag of the plurality of digital emission tags further comprises a gas emission visualization juxtaposed on a side view visual representation of the gas emission source.

23. The handheld inspection apparatus of claim 22, wherein the side view visual representation of the gas emission source comprises a visual image or a 3D model.

* * * * *